(12) United States Patent
Farris et al.

(10) Patent No.: US 8,379,531 B2
(45) Date of Patent: *Feb. 19, 2013

(54) TELEPHONY COMMUNICATION VIA VARIED REDUNDANT NETWORKS

(75) Inventors: Robert D. Farris, Sterling, VA (US); Dale L. Bartholomew, Vienna, VA (US)

(73) Assignee: Verizon Services Corp., Ashburn, VA (US)

( * ) Notice: Subject to any disclaimer, the term of this patent is extended or adjusted under 35 U.S.C. 154(b) by 666 days.

This patent is subject to a terminal disclaimer.

(21) Appl. No.: 12/240,565

(22) Filed: Sep. 29, 2008

(65) Prior Publication Data

US 2009/0022147 A1 Jan. 22, 2009

Related U.S. Application Data

(63) Continuation of application No. 11/354,033, filed on Feb. 15, 2006, now Pat. No. 7,483,417, which is a continuation of application No. 09/617,816, filed on Jul. 17, 2000, now Pat. No. 7,012,898.

(51) Int. Cl.
*H04J 1/16* (2006.01)
*H04L 12/56* (2006.01)

(52) U.S. Cl. ................ 370/252; 370/352; 370/400

(58) Field of Classification Search ................ 370/252, 370/352, 400
See application file for complete search history.

(56) References Cited

U.S. PATENT DOCUMENTS

| | | | |
|---|---|---|---|
| 4,054,756 A | 10/1977 | Comella et al. |
| 4,100,377 A | 7/1978 | Flanagan |
| 4,191,860 A | 3/1980 | Weber |
| 4,201,891 A | 5/1980 | Lawrence et al. |
| 4,310,727 A | 1/1982 | Lawser |
| 4,313,035 A | 1/1982 | Jordan et al. |

(Continued)

FOREIGN PATENT DOCUMENTS

| | | |
|---|---|---|
| EP | 0235257 | 2/1987 |
| EP | 0335562 | 4/1989 |

(Continued)

OTHER PUBLICATIONS

Rendleman, John, et al., "ATM Goes Into Orbit . . . While IP Gets Speedy in Space," Communications Week, Mar. 17, 1997, www.commweek.com.

(Continued)

*Primary Examiner* — John Pezzlo

(57) ABSTRACT

A switched telephone network is arranged in a manner to enable packet voice communication between telephone terminals via multiple redundant packet switched networks. The packet switched networks may utilize different protocols, be operated by different entities, and have primary functions other than voice communication. One example of such a network may be internetworked networks, such as the Internet. One example of an alternate packet switched network may be a network whose primary function is control of a circuit switched telephone network. The common channel interoffice switching system (CCIS) of a public switched telephone network (PSTN) is a preferred example.

A voice communication link may be established from telephone terminal to telephone terminal via the Internet, the quality of voice communication may be monitored, and the link may be transferred to the common channel interoffice signaling network if and when the quality of voice communication deteriorates beneath a pre-established norm. There is provided a means for monitoring the links of the common channel interoffice signaling system carrying the packetized voice communication and collecting the information needed to permit charging for the voice communication by time duration or by cells used to carry the packetized voice signal. The customer may be provided with the option of establishing the norm for diversion of the communication, or may elect which path is to be selected as the primary path.

23 Claims, 4 Drawing Sheets

U.S. PATENT DOCUMENTS

| | | | |
|---|---|---|---|
| 4,313,036 A | 1/1982 | Jabara et al. |
| 4,371,751 A | 2/1983 | Hilligoss et al. |
| 4,371,752 A | 2/1983 | Matthews et al. |
| 4,375,097 A | 2/1983 | Ulug |
| 4,555,594 A | 11/1985 | Friedes et al. |
| 4,565,903 A | 1/1986 | Riley |
| 4,577,066 A | 3/1986 | Bimonte et al. |
| 4,585,906 A | 4/1986 | Matthews et al. |
| 4,602,129 A | 7/1986 | Matthews et al. |
| 4,609,778 A | 9/1986 | Franklin et al. |
| 4,611,094 A | 9/1986 | Asmuth et al. |
| 4,611,096 A | 9/1986 | Asmuth et al. |
| 4,625,081 A | 11/1986 | Lotito et al. |
| 4,630,262 A | 12/1986 | Callens et al. |
| 4,652,700 A | 3/1987 | Matthews et al. |
| 4,653,045 A | 3/1987 | Stanley et al. |
| 4,672,700 A | 6/1987 | Poncy |
| 4,679,190 A | 7/1987 | Dias et al. |
| 4,685,125 A | 8/1987 | Zave |
| 4,710,917 A | 12/1987 | Tompkins et al. |
| 4,713,806 A | 12/1987 | Oberlander et al. |
| 4,718,005 A | 1/1988 | Feigenbaum et al. |
| 4,730,071 A | 3/1988 | Schoenthal et al. |
| 4,734,931 A | 3/1988 | Bourg et al. |
| 4,741,820 A | 5/1988 | Coughlin et al. |
| 4,747,127 A | 5/1988 | Hansen et al. |
| 4,747,130 A | 5/1988 | Ho |
| 4,748,618 A | 5/1988 | Brown et al. |
| 4,765,924 A | 8/1988 | Inoue et al. |
| 4,766,604 A | 8/1988 | Axberg |
| 4,771,425 A | 9/1988 | Baran et al. |
| 4,782,485 A | 11/1988 | Gollub |
| 4,788,718 A | 11/1988 | McNabb et al. |
| 4,790,003 A | 12/1988 | Kepley et al. |
| 4,821,034 A | 4/1989 | Anderson et al. |
| 4,827,500 A | 5/1989 | Binkerd et al. |
| 4,865,763 A | 9/1989 | Inoue et al. |
| 4,866,763 A | 9/1989 | Cooper et al. |
| 4,872,157 A | 10/1989 | Hemmady et al. |
| 4,872,159 A | 10/1989 | Hemmady et al. |
| 4,872,160 A | 10/1989 | Hemmady et al. |
| 4,872,197 A | 10/1989 | Pemmaraju |
| 4,875,206 A | 10/1989 | Nichols et al. |
| 4,877,949 A | 10/1989 | Danielson et al. |
| 4,882,476 A | 11/1989 | White |
| 4,893,302 A | 1/1990 | Hemmady et al. |
| 4,894,824 A | 1/1990 | Hemmady et al. |
| 4,897,874 A | 1/1990 | Lidinsky et al. |
| 4,899,333 A | 2/1990 | Roediger |
| 4,899,373 A | 2/1990 | Lee et al. |
| 4,910,794 A | 3/1990 | Mahany |
| 4,916,691 A | 4/1990 | Goodman |
| 4,918,722 A | 4/1990 | Duehren et al. |
| 4,922,348 A | 5/1990 | Gillon et al. |
| 4,922,486 A | 5/1990 | Lidinsky et al. |
| 4,933,931 A | 6/1990 | Kokubo |
| 4,942,574 A | 7/1990 | Zelle |
| 4,958,341 A | 9/1990 | Hemmady et al. |
| 4,969,184 A | 11/1990 | Gordon et al. |
| 4,979,206 A | 12/1990 | Padden et al. |
| 4,996,707 A | 2/1991 | O'Malley et al. |
| D315,573 S | 3/1991 | Schultz et al. |
| 5,008,906 A | 4/1991 | Reichwein |
| 5,008,926 A | 4/1991 | Misholi |
| 5,009,337 A | 4/1991 | Bimbi |
| 5,012,511 A | 4/1991 | Hanle et al. |
| 5,018,191 A | 5/1991 | Catron et al. |
| 5,019,699 A | 5/1991 | Koenck |
| 5,023,868 A | 6/1991 | Davidson et al. |
| 5,025,254 A | 6/1991 | Hess |
| 5,029,196 A | 7/1991 | Morganstein |
| 5,029,199 A | 7/1991 | Jones et al. |
| 5,029,200 A | 7/1991 | Haas et al. |
| 5,031,098 A | 7/1991 | Miller et al. |
| 5,034,975 A | 7/1991 | Grimes |
| 5,052,020 A | 9/1991 | Koenck et al. |
| 5,052,943 A | 10/1991 | Davis |
| 5,065,393 A | 11/1991 | Sibbitt et al. |
| 5,068,888 A | 11/1991 | Scherk et al. |
| 5,070,536 A | 12/1991 | Mahany et al. |
| 5,098,877 A | 3/1992 | Coughlin et al. |
| 5,107,492 A | 4/1992 | Roux et al. |
| 5,113,499 A | 5/1992 | Ankney et al. |
| 5,115,431 A | 5/1992 | Williams et al. |
| 5,115,495 A | 5/1992 | Tsuchiya et al. |
| 5,123,064 A | 6/1992 | Hacker et al. |
| 5,134,647 A | 7/1992 | Pugh et al. |
| 5,144,282 A | 9/1992 | Sutterlin et al. |
| 5,146,488 A | 9/1992 | Okada et al. |
| 5,146,491 A | 9/1992 | Silver et al. |
| 5,157,390 A | 10/1992 | Yoshie et al. |
| 5,157,662 A | 10/1992 | Tadamura et al. |
| 5,159,592 A | 10/1992 | Perkins |
| 5,159,624 A | 10/1992 | Makita |
| 5,163,080 A | 11/1992 | Amoroso et al. |
| 5,164,938 A | 11/1992 | Jurkevich et al. |
| 5,180,232 A | 1/1993 | Chadima et al. |
| 5,185,860 A | 2/1993 | Wu |
| 5,193,110 A | 3/1993 | Jones et al. |
| 5,195,085 A | 3/1993 | Bertsch et al. |
| 5,195,086 A | 3/1993 | Baumgartner et al. |
| 5,195,128 A | 3/1993 | Knitl |
| 5,195,183 A | 3/1993 | Miller et al. |
| 5,199,062 A | 3/1993 | Von Meister et al. |
| 5,200,993 A | 4/1993 | Wheeler et al. |
| 5,202,817 A | 4/1993 | Koenck et al. |
| 5,202,825 A | 4/1993 | Miller et al. |
| 5,204,894 A | 4/1993 | Darden |
| 5,206,901 A | 4/1993 | Harlow et al. |
| 5,208,848 A | 5/1993 | Pula |
| 5,215,011 A | 6/1993 | Monney |
| 5,216,233 A | 6/1993 | Main et al. |
| 5,218,187 A | 6/1993 | Koenck et al. |
| 5,218,188 A | 6/1993 | Hanson |
| 5,223,699 A | 6/1993 | Flynn et al. |
| 5,223,820 A | 6/1993 | Sutterlin et al. |
| 5,225,071 A | 7/1993 | Coughlin et al. |
| 5,226,075 A | 7/1993 | Funk et al. |
| 5,227,614 A | 7/1993 | Danielson et al. |
| 5,231,492 A | 7/1993 | Dangi et al. |
| 5,235,317 A | 8/1993 | Sutterlin et al. |
| 5,237,604 A | 8/1993 | Ryan |
| 5,241,588 A | 8/1993 | Babson et al. |
| 5,243,645 A | 9/1993 | Bissell et al. |
| 5,243,654 A | 9/1993 | Hunter |
| 5,247,571 A | 9/1993 | Kay et al. |
| 5,254,971 A | 10/1993 | Sutterlin et al. |
| 5,260,986 A | 11/1993 | Pershan |
| 5,263,080 A | 11/1993 | Jones et al. |
| 5,265,155 A | 11/1993 | Castro |
| 5,272,749 A | 12/1993 | Masek |
| 5,274,696 A | 12/1993 | Perelman |
| 5,280,159 A | 1/1994 | Schultz et al. |
| 5,287,199 A | 2/1994 | Zoccolillo |
| 5,289,378 A | 2/1994 | Miller et al. |
| 5,289,468 A | 2/1994 | Yoshida |
| 5,295,154 A | 3/1994 | Meier et al. |
| 5,303,297 A | 4/1994 | Hillis |
| 5,305,181 A | 4/1994 | Schultz |
| 5,308,966 A | 5/1994 | Danielson et al. |
| 5,309,437 A | 5/1994 | Perlman et al. |
| 5,311,583 A | 5/1994 | Friedes et al. |
| 5,313,053 A | 5/1994 | Koenck et al. |
| 5,317,566 A | 5/1994 | Joshi |
| 5,317,691 A | 5/1994 | Traeger |
| 5,318,719 A | 6/1994 | Hughes et al. |
| 5,322,991 A | 6/1994 | Hanson |
| 5,325,421 A | 6/1994 | Hou et al. |
| 5,327,421 A | 7/1994 | Hiller et al. |
| 5,327,486 A | 7/1994 | Wolff et al. |
| 5,329,520 A | 7/1994 | Richardson |
| 5,329,578 A | 7/1994 | Brennan et al. |
| 5,331,580 A | 7/1994 | Miller et al. |
| 5,333,266 A | 7/1994 | Boaz et al. |
| 5,341,374 A | 8/1994 | Lewen et al. |
| 5,345,446 A | 9/1994 | Hiller et al. |
| 5,346,611 A | 9/1994 | Coughlin et al. |

| | | |
|---|---|---|
| 5,347,633 A | 9/1994 | Ashfield et al. |
| 5,349,497 A | 9/1994 | Hanson et al. |
| 5,349,678 A | 9/1994 | Morris et al. |
| 5,351,286 A | 9/1994 | Nici |
| 5,353,331 A | 10/1994 | Emery et al. |
| 5,359,185 A | 10/1994 | Hanson |
| 5,361,256 A | 11/1994 | Doeringer et al. |
| 5,365,524 A | 11/1994 | Hiller et al. |
| 5,365,546 A | 11/1994 | Koenck et al. |
| 5,367,566 A | 11/1994 | Moe et al. |
| 5,371,858 A | 12/1994 | Miller et al. |
| 5,375,068 A | 12/1994 | Palmer et al. |
| 5,375,159 A | 12/1994 | Williams |
| 5,377,186 A | 12/1994 | Wegner et al. |
| 5,381,465 A | 1/1995 | Carter et al. |
| 5,384,831 A | 1/1995 | Creswell et al. |
| 5,384,840 A | 1/1995 | Blatchford et al. |
| 5,386,467 A | 1/1995 | Ahmad |
| 5,390,175 A | 2/1995 | Hiller et al. |
| 5,390,335 A | 2/1995 | Stephan et al. |
| 5,392,344 A | 2/1995 | Ash et al. |
| 5,392,402 A | 2/1995 | Robrock |
| 5,394,436 A | 2/1995 | Meier et al. |
| 5,396,542 A | 3/1995 | Alger et al. |
| 5,400,393 A | 3/1995 | Knuth et al. |
| 5,402,478 A | 3/1995 | Hluchyj et al. |
| 5,406,557 A | 4/1995 | Baudoin |
| 5,408,237 A | 4/1995 | Patterson et al. |
| 5,408,382 A | 4/1995 | Schultz et al. |
| 5,410,141 A | 4/1995 | Koenck et al. |
| 5,410,754 A | 4/1995 | Klotzbach et al. |
| 5,416,842 A | 5/1995 | Aziz |
| 5,418,844 A | 5/1995 | Morrisey et al. |
| 5,420,211 A | 5/1995 | Hughes et al. |
| 5,420,916 A | 5/1995 | Sekiguchi |
| 5,422,882 A | 6/1995 | Hiller et al. |
| 5,422,940 A | 6/1995 | Endo et al. |
| 5,422,941 A | 6/1995 | Hasenauer et al. |
| 5,425,028 A | 6/1995 | Britton et al. |
| 5,425,051 A | 6/1995 | Mahany |
| 5,425,085 A | 6/1995 | Weinberger et al. |
| 5,425,090 A | 6/1995 | Orriss |
| 5,425,091 A | 6/1995 | Josephs |
| 5,425,780 A | 6/1995 | Flatt et al. |
| 5,426,636 A | 6/1995 | Hiller et al. |
| 5,428,608 A | 6/1995 | Freeman et al. |
| 5,428,636 A | 6/1995 | Meier |
| 5,430,719 A | 7/1995 | Weisser |
| 5,430,727 A | 7/1995 | Callon |
| 5,434,852 A | 7/1995 | La Porta et al. |
| 5,434,913 A | 7/1995 | Tung et al. |
| 5,436,957 A | 7/1995 | McConnell |
| 5,436,963 A | 7/1995 | Fitzpatrick et al. |
| 5,440,563 A | 8/1995 | Isidoro et al. |
| 5,440,620 A | 8/1995 | Slusky |
| 5,440,621 A | 8/1995 | Castro |
| 5,442,690 A | 8/1995 | Nazif et al. |
| 5,444,709 A | 8/1995 | Riddle |
| 5,448,633 A | 9/1995 | Jamaleddin et al. |
| 5,450,411 A | 9/1995 | Heil |
| 5,452,289 A | 9/1995 | Sharma et al. |
| 5,452,297 A | 9/1995 | Hiller et al. |
| 5,452,350 A | 9/1995 | Reynolds et al. |
| 5,455,821 A | 10/1995 | Schaeffer et al. |
| 5,457,629 A | 10/1995 | Miller et al. |
| 5,459,775 A | 10/1995 | Isono et al. |
| 5,461,611 A | 10/1995 | Drake et al. |
| 5,463,677 A | 10/1995 | Bash et al. |
| 5,465,207 A | 11/1995 | Boatwright et al. |
| 5,466,170 A | 11/1995 | Pavek |
| 5,468,947 A | 11/1995 | Danielson et al. |
| 5,468,950 A | 11/1995 | Hanson |
| 5,469,496 A | 11/1995 | Emery et al. |
| 5,469,497 A | 11/1995 | Pierce et al. |
| 5,469,500 A | 11/1995 | Satter et al. |
| 5,473,608 A | 12/1995 | Gagne et al. |
| 5,473,677 A | 12/1995 | D'Amato et al. |
| 5,475,732 A | 12/1995 | Pester |
| 5,475,737 A | 12/1995 | Garner et al. |
| 5,475,748 A | 12/1995 | Jones |
| 5,475,817 A | 12/1995 | Waldo et al. |
| 5,477,531 A | 12/1995 | McKee et al. |
| 5,479,494 A | 12/1995 | Clitherow |
| 5,481,603 A | 1/1996 | Gutierrez et al. |
| 5,483,527 A | 1/1996 | Doshi et al. |
| 5,483,549 A | 1/1996 | Weinberg et al. |
| 5,483,586 A | 1/1996 | Sussman |
| 5,483,587 A | 1/1996 | Hogan et al. |
| 5,483,676 A | 1/1996 | Mahany et al. |
| 5,487,111 A | 1/1996 | Slusky |
| 5,488,575 A | 1/1996 | Danielson et al. |
| 5,490,247 A | 2/1996 | Tung et al. |
| 5,493,568 A | 2/1996 | Sampat et al. |
| 5,493,573 A | 2/1996 | Kobayashi et al. |
| 5,495,521 A | 2/1996 | Rangachar |
| 5,500,859 A | 3/1996 | Sharma et al. |
| 5,500,889 A | 3/1996 | Baker et al. |
| 5,504,746 A | 4/1996 | Meier |
| 5,506,887 A | 4/1996 | Emery et al. |
| 5,506,893 A | 4/1996 | Buscher et al. |
| 5,511,111 A | 4/1996 | Serbetcioglu et al. |
| 5,513,127 A | 4/1996 | Gard et al. |
| 5,515,303 A | 5/1996 | Cargin et al. |
| 5,517,434 A | 5/1996 | Hanson et al. |
| 5,517,560 A | 5/1996 | Greenspan |
| 5,520,796 A | 5/1996 | Chen et al. |
| 5,521,370 A | 5/1996 | Hanson |
| 5,521,719 A | 5/1996 | Yamada |
| 5,521,924 A | 5/1996 | Kakuma et al. |
| 5,524,137 A | 6/1996 | Rhee |
| 5,524,145 A | 6/1996 | Parker |
| 5,526,353 A | 6/1996 | Henley et al. |
| 5,526,416 A | 6/1996 | Dezonno et al. |
| 5,526,489 A | 6/1996 | Nilakantan et al. |
| 5,528,539 A | 6/1996 | Ong et al. |
| 5,530,744 A | 6/1996 | Charalambous et al. |
| 5,530,852 A | 6/1996 | Meske et al. |
| 5,537,470 A | 7/1996 | Lee |
| 5,539,193 A | 7/1996 | Gibbs et al. |
| 5,539,194 A | 7/1996 | Miller et al. |
| 5,539,884 A | 7/1996 | Robrock |
| 5,539,886 A | 7/1996 | Aldred et al. |
| 5,541,398 A | 7/1996 | Hanson |
| 5,541,917 A | 7/1996 | Farris |
| 5,541,927 A | 7/1996 | Kristol et al. |
| 5,541,930 A | 7/1996 | Klingman |
| 5,544,010 A | 8/1996 | Schultz et al. |
| 5,551,025 A | 8/1996 | O'Reilly et al. |
| 5,551,035 A | 8/1996 | Arnold et al. |
| 5,555,276 A | 9/1996 | Koenck et al. |
| 5,559,068 A | 9/1996 | Chen et al. |
| 5,559,721 A | 9/1996 | Ishii |
| 5,559,871 A | 9/1996 | Smith |
| 5,561,670 A | 10/1996 | Hoffert et al. |
| 5,563,882 A | 10/1996 | Bruno et al. |
| 5,568,645 A | 10/1996 | Morris et al. |
| 5,572,583 A | 11/1996 | Wheeler et al. |
| 5,575,961 A | 11/1996 | Kuwabara et al. |
| 5,576,529 A | 11/1996 | Koenck et al. |
| 5,579,472 A | 11/1996 | Keyworth et al. |
| 5,583,564 A | 12/1996 | Rao et al. |
| 5,583,920 A | 12/1996 | Wheeler |
| 5,583,926 A | 12/1996 | Venier et al. |
| 5,583,929 A | 12/1996 | Ardon |
| 5,586,175 A | 12/1996 | Hogan et al. |
| 5,586,177 A | 12/1996 | Farris et al. |
| 5,587,577 A | 12/1996 | Schultz |
| 5,590,127 A | 12/1996 | Bales et al. |
| 5,590,133 A | 12/1996 | Billstrom et al. |
| 5,590,181 A | 12/1996 | Hogan et al. |
| 5,590,346 A | 12/1996 | West et al. |
| 5,594,717 A | 1/1997 | Watanabe et al. |
| 5,594,769 A | 1/1997 | Pellegrino et al. |
| 5,594,784 A | 1/1997 | Velius |
| 5,594,789 A | 1/1997 | Seazholtz et al. |
| 5,598,464 A | 1/1997 | Hess et al. |
| 5,598,487 A | 1/1997 | Hacker et al. |
| 5,602,456 A | 2/1997 | Cargin et al. |

| Patent | Date | Name |
|---|---|---|
| 5,602,854 A | 2/1997 | Luse et al. |
| 5,603,085 A | 2/1997 | Shedlo |
| 5,604,682 A | 2/1997 | McLaughlin et al. |
| 5,604,737 A | 2/1997 | Iwami et al. |
| 5,608,446 A | 3/1997 | Carr et al. |
| 5,608,447 A | 3/1997 | Farry et al. |
| 5,608,706 A | 3/1997 | Park |
| 5,608,786 A | 3/1997 | Gordon |
| 5,610,910 A | 3/1997 | Focsaneanu et al. |
| 5,610,972 A | 3/1997 | Emery et al. |
| 5,610,976 A | 3/1997 | Uota et al. |
| 5,610,977 A | 3/1997 | Williams et al. |
| 5,615,251 A | 3/1997 | Hogan et al. |
| 5,617,343 A | 4/1997 | Danielson et al. |
| 5,617,422 A | 4/1997 | Litzenberger et al. |
| 5,617,540 A | 4/1997 | Civanlar et al. |
| 5,619,555 A | 4/1997 | Fenton et al. |
| 5,619,557 A | 4/1997 | Van Berkum |
| 5,619,562 A | 4/1997 | Maurer et al. |
| 5,621,787 A | 4/1997 | McKoy et al. |
| 5,623,601 A | 4/1997 | Vu |
| 5,625,180 A | 4/1997 | Hanson et al. |
| 5,625,404 A | 4/1997 | Grady et al. |
| 5,625,407 A | 4/1997 | Biggs et al. |
| 5,625,555 A | 4/1997 | Davis |
| 5,625,675 A | 4/1997 | Katsumaru et al. |
| 5,625,677 A | 4/1997 | Feiertag et al. |
| 5,625,681 A | 4/1997 | Butler |
| 5,625,682 A | 4/1997 | Gray et al. |
| 5,626,682 A | 5/1997 | Kobari et al. |
| 5,627,886 A | 5/1997 | Bowman |
| 5,633,916 A | 5/1997 | Goldhagen et al. |
| 5,633,919 A | 5/1997 | Hogan et al. |
| 5,636,216 A | 6/1997 | Fox et al. |
| 5,638,430 A | 6/1997 | Hogan et al. |
| 5,640,001 A | 6/1997 | Danielson et al. |
| 5,644,471 A | 7/1997 | Schultz et al. |
| 5,646,982 A | 7/1997 | Hogan et al. |
| 5,651,006 A | 7/1997 | Fujino et al. |
| 5,652,787 A | 7/1997 | O'Kelly |
| 5,654,957 A | 8/1997 | Koyama |
| 5,657,250 A | 8/1997 | Park et al. |
| 5,657,317 A | 8/1997 | Mahany et al. |
| 5,661,197 A | 8/1997 | Villiger et al. |
| 5,661,782 A | 8/1997 | Bartholomew et al. |
| 5,661,790 A | 8/1997 | Hsu |
| 5,661,792 A | 8/1997 | Akinpelu et al. |
| 5,663,208 A | 9/1997 | Martin |
| 5,664,005 A | 9/1997 | Emery et al. |
| 5,664,102 A | 9/1997 | Faynberg |
| 5,668,857 A | 9/1997 | McHale |
| 5,669,062 A | 9/1997 | Olds et al. |
| 5,671,436 A | 9/1997 | Morris et al. |
| 5,672,860 A | 9/1997 | Miller et al. |
| 5,673,031 A | 9/1997 | Meier |
| 5,673,080 A | 9/1997 | Biggs et al. |
| 5,673,263 A | 9/1997 | Basso et al. |
| 5,675,507 A | 10/1997 | Bobo |
| 5,675,741 A | 10/1997 | Aggarwal et al. |
| 5,679,943 A | 10/1997 | Schultz et al. |
| 5,680,392 A | 10/1997 | Semaan |
| 5,680,442 A | 10/1997 | Bartholomew et al. |
| 5,680,446 A | 10/1997 | Fleischer et al. |
| 5,680,633 A | 10/1997 | Koenck et al. |
| 5,682,379 A | 10/1997 | Mahany et al. |
| 5,687,167 A | 11/1997 | Bertin et al. |
| 5,689,550 A | 11/1997 | Garson et al. |
| 5,689,553 A | 11/1997 | Ahuja et al. |
| 5,692,039 A | 11/1997 | Brankley et al. |
| 5,694,318 A | 12/1997 | Miller et al. |
| 5,694,463 A | 12/1997 | Christie et al. |
| 5,696,903 A | 12/1997 | Mahany |
| 5,699,089 A | 12/1997 | Murray |
| 5,699,352 A | 12/1997 | Kriete et al. |
| 5,699,528 A | 12/1997 | Hogan |
| 5,701,295 A | 12/1997 | Bales et al. |
| 5,701,465 A | 12/1997 | Baugher et al. |
| 5,703,935 A | 12/1997 | Raissyan et al. |
| 5,703,942 A | 12/1997 | Pinard et al. |
| 5,706,286 A | 1/1998 | Reiman et al. |
| 5,708,680 A | 1/1998 | Gollnick et al. |
| 5,708,833 A | 1/1998 | Kinney et al. |
| 5,710,728 A | 1/1998 | Danielson et al. |
| 5,710,884 A | 1/1998 | Dedrick |
| 5,712,903 A | 1/1998 | Bartholomew et al. |
| 5,712,906 A | 1/1998 | Grady et al. |
| 5,712,907 A | 1/1998 | Wegner et al. |
| 5,712,908 A | 1/1998 | Brinkman et al. |
| 5,719,854 A | 2/1998 | Choudhury et al. |
| 5,722,067 A | 2/1998 | Fougnies et al. |
| 5,724,355 A | 3/1998 | Bruno et al. |
| 5,724,406 A | 3/1998 | Juster |
| 5,724,412 A | 3/1998 | Srinivasan |
| 5,726,984 A | 3/1998 | Kubler et al. |
| 5,727,002 A | 3/1998 | Miller et al. |
| 5,727,129 A | 3/1998 | Barrett et al. |
| 5,729,544 A | 3/1998 | Lev et al. |
| 5,729,599 A | 3/1998 | Plomondon et al. |
| 5,732,078 A | 3/1998 | Arango |
| 5,732,213 A | 3/1998 | Gessel et al. |
| 5,737,333 A | 4/1998 | Civanlar et al. |
| 5,737,395 A | 4/1998 | Irribarren |
| 5,737,404 A | 4/1998 | Segal |
| 5,737,414 A | 4/1998 | Walker et al. |
| 5,740,075 A | 4/1998 | Bigham et al. |
| 5,740,164 A | 4/1998 | Liron |
| 5,740,366 A | 4/1998 | Mahany et al. |
| 5,742,596 A | 4/1998 | Baratz et al. |
| 5,742,668 A | 4/1998 | Pepe et al. |
| 5,742,670 A | 4/1998 | Bennett |
| 5,742,675 A | 4/1998 | Kilander et al. |
| 5,742,905 A | 4/1998 | Pepe et al. |
| 5,744,533 A | 4/1998 | Iwamoto et al. |
| 5,747,785 A | 5/1998 | Miller et al. |
| 5,747,786 A | 5/1998 | Cargin et al. |
| 5,748,104 A | 5/1998 | Argyroudis et al. |
| 5,748,468 A | 5/1998 | Notenboom et al. |
| 5,748,619 A | 5/1998 | Meier |
| 5,751,706 A | 5/1998 | Land et al. |
| 5,751,707 A | 5/1998 | Voit et al. |
| 5,751,961 A | 5/1998 | Smyk |
| 5,754,639 A | 5/1998 | Flockhart et al. |
| 5,754,641 A | 5/1998 | Voit et al. |
| 5,757,784 A | 5/1998 | Liebowitz et al. |
| 5,758,281 A | 5/1998 | Emery et al. |
| 5,761,294 A | 6/1998 | Shaffer et al. |
| 5,763,867 A | 6/1998 | Main et al. |
| 5,764,741 A | 6/1998 | Barak |
| 5,768,513 A | 6/1998 | Kuthyar et al. |
| 5,774,530 A | 6/1998 | Montgomery et al. |
| 5,774,533 A | 6/1998 | Patel |
| 5,774,535 A | 6/1998 | Castro |
| 5,774,660 A | 6/1998 | Brendel et al. |
| 5,774,695 A | 6/1998 | Autrey et al. |
| 5,778,313 A | 7/1998 | Fougnies |
| 5,781,550 A | 7/1998 | Templin et al. |
| 5,781,620 A | 7/1998 | Montgomery et al. |
| 5,781,624 A | 7/1998 | Mitra et al. |
| 5,784,617 A | 7/1998 | Greenstein et al. |
| 5,787,160 A | 7/1998 | Chaney et al. |
| 5,790,172 A | 8/1998 | Imanaka |
| 5,790,536 A | 8/1998 | Mahany et al. |
| 5,790,548 A | 8/1998 | Sistanizadeh et al. |
| 5,790,806 A | 8/1998 | Koperda |
| 5,793,762 A | 8/1998 | Penners et al. |
| 5,793,763 A | 8/1998 | Mayes et al. |
| 5,793,771 A | 8/1998 | Darland et al. |
| 5,794,043 A | 8/1998 | Kolb |
| 5,796,790 A | 8/1998 | Brunner |
| 5,799,072 A | 8/1998 | Vulcan et al. |
| 5,799,156 A | 8/1998 | Hogan et al. |
| 5,802,502 A | 9/1998 | Gell et al. |
| 5,802,510 A | 9/1998 | Jones |
| 5,802,513 A | 9/1998 | Bowie |
| 5,804,805 A | 9/1998 | Koenck et al. |
| 5,805,474 A | 9/1998 | Danielson et al. |
| 5,805,587 A | 9/1998 | Norris et al. |
| 5,805,682 A | 9/1998 | Voit et al. |

| | | | | | | |
|---|---|---|---|---|---|---|
| 5,805,807 A | 9/1998 | Hanson et al. | | 5,936,958 A | 8/1999 | Soumiya et al. |
| 5,809,128 A | 9/1998 | McMullin | | 5,937,045 A | 8/1999 | Yaoya et al. |
| 5,812,534 A | 9/1998 | Davis et al. | | 5,940,479 A | 8/1999 | Guy et al. |
| 5,812,639 A | 9/1998 | Bartholomew et al. | | 5,940,598 A | 8/1999 | Strauss et al. |
| 5,812,652 A | 9/1998 | Jodoin et al. | | 5,940,616 A | 8/1999 | Wang |
| 5,812,795 A | 9/1998 | Horovitz et al. | | 5,940,771 A | 8/1999 | Gollnick et al. |
| 5,812,834 A | 9/1998 | Suzuki | | 5,944,795 A | 8/1999 | Civanlar |
| 5,812,865 A | 9/1998 | Theimer et al. | | 5,946,299 A | 8/1999 | Blonder |
| 5,818,836 A | 10/1998 | DuVal | | 5,946,386 A | 8/1999 | Rogers et al. |
| 5,818,921 A | 10/1998 | Vander Meiden et al. | | 5,949,056 A | 9/1999 | White |
| 5,825,780 A | 10/1998 | Christie | | 5,949,776 A | 9/1999 | Mahany et al. |
| 5,825,862 A | 10/1998 | Voit et al. | | 5,949,869 A | 9/1999 | Sink et al. |
| 5,825,863 A | 10/1998 | Walker | | 5,953,322 A | 9/1999 | Kimball |
| 5,825,869 A | 10/1998 | Brooks et al. | | 5,953,338 A | 9/1999 | Ma et al. |
| 5,826,268 A | 10/1998 | Schaefer et al. | | 5,953,504 A | 9/1999 | Sokal et al. |
| 5,828,737 A | 10/1998 | Sawyer | | 5,953,651 A | 9/1999 | Lu et al. |
| 5,828,740 A | 10/1998 | Khuc et al. | | 5,956,391 A | 9/1999 | Melen et al. |
| 5,828,844 A | 10/1998 | Civanlar et al. | | 5,956,482 A | 9/1999 | Agraharam et al. |
| 5,832,197 A | 11/1998 | Houji | | 5,956,697 A | 9/1999 | Usui |
| 5,834,753 A | 11/1998 | Danielson et al. | | 5,958,016 A | 9/1999 | Chang et al. |
| 5,835,723 A | 11/1998 | Andrews et al. | | 5,958,052 A | 9/1999 | Bellovin et al. |
| 5,838,665 A | 11/1998 | Kahn et al. | | 5,959,998 A | 9/1999 | Takahashi et al. |
| 5,838,682 A | 11/1998 | Dekelbaum et al. | | 5,962,837 A | 10/1999 | Main et al. |
| 5,838,686 A | 11/1998 | Ozkan | | 5,966,431 A | 10/1999 | Reiman et al. |
| 5,838,970 A | 11/1998 | Thomas | | 5,966,434 A | 10/1999 | Schafer et al. |
| 5,841,764 A | 11/1998 | Roderique et al. | | 5,969,321 A | 10/1999 | Danielson et al. |
| 5,844,893 A | 12/1998 | Gollnick et al. | | 5,970,065 A | 10/1999 | Miloslavsky |
| 5,844,896 A | 12/1998 | Marks et al. | | 5,970,477 A | 10/1999 | Roden |
| 5,845,267 A | 12/1998 | Ronen | | 5,974,043 A | 10/1999 | Solomon |
| 5,848,143 A | 12/1998 | Andrews et al. | | 5,974,052 A | 10/1999 | Johnson et al. |
| 5,850,358 A | 12/1998 | Danielson et al. | | 5,978,569 A | 11/1999 | Traeger |
| 5,850,433 A | 12/1998 | Rondeau | | 5,978,840 A | 11/1999 | Nguyen et al. |
| 5,854,833 A | 12/1998 | Hogan et al. | | 5,979,768 A | 11/1999 | Koenck |
| 5,854,975 A | 12/1998 | Fougnies et al. | | 5,982,774 A | 11/1999 | Foladare et al. |
| 5,856,364 A | 1/1999 | Martin | | 5,987,108 A | 11/1999 | Jagadish et al. |
| 5,858,052 A | 1/1999 | Kopylov et al. | | 5,987,499 A | 11/1999 | Morris et al. |
| 5,862,171 A | 1/1999 | Mahany | | 5,991,291 A | 11/1999 | Asai et al. |
| 5,864,604 A | 1/1999 | Moen et al. | | 5,991,292 A | 11/1999 | Focsaneanu et al. |
| 5,864,610 A | 1/1999 | Ronen | | 5,991,301 A | 11/1999 | Christie |
| 5,867,495 A | 2/1999 | Elliott et al. | | 5,991,308 A | 11/1999 | Fuhrmann et al. |
| 5,867,562 A | 2/1999 | Scherer | | 5,991,864 A | 11/1999 | Kinney et al. |
| 5,867,566 A | 2/1999 | Hogan et al. | | 5,995,503 A | 11/1999 | Crawley et al. |
| 5,870,565 A | 2/1999 | Glitho | | 5,995,606 A | 11/1999 | Civanlar et al. |
| 5,873,099 A | 2/1999 | Hogan et al. | | 5,995,608 A | 11/1999 | Detampel et al. |
| 5,878,126 A | 3/1999 | Velamuri et al. | | 5,999,524 A | 12/1999 | Corbalis et al. |
| 5,878,130 A | 3/1999 | Andrews et al. | | 5,999,525 A | 12/1999 | Krishnaswamy et al. |
| 5,878,212 A | 3/1999 | Civanlar et al. | | 6,005,926 A | 12/1999 | Mashinsky |
| 5,881,134 A | 3/1999 | Foster et al. | | 6,006,100 A | 12/1999 | Koenck |
| 5,883,891 A | 3/1999 | Williams et al. | | 6,006,253 A | 12/1999 | Kumar et al. |
| 5,884,032 A | 3/1999 | Bateman et al. | | 6,011,975 A | 1/2000 | Emery et al. |
| 5,888,087 A | 3/1999 | Hanson et al. | | 6,012,088 A | 1/2000 | Li et al. |
| 5,889,774 A | 3/1999 | Mirashrafi et al. | | 6,014,379 A | 1/2000 | White et al. |
| 5,892,754 A | 4/1999 | Kompella et al. | | 6,014,687 A | 1/2000 | Watanabe et al. |
| 5,892,822 A | 4/1999 | Gottlieb et al. | | 6,016,307 A | 1/2000 | Kaplan et al. |
| 5,892,971 A | 4/1999 | Danielson et al. | | 6,016,343 A | 1/2000 | Hogan et al. |
| 5,895,431 A | 4/1999 | Miller et al. | | 6,018,360 A | 1/2000 | Stewart et al. |
| 5,895,906 A | 4/1999 | Danielson et al. | | 6,018,567 A | 1/2000 | Dulman |
| 5,898,668 A | 4/1999 | Shaffer | | 6,021,126 A | 2/2000 | White et al. |
| 5,898,673 A | 4/1999 | Riggan et al. | | 6,021,263 A | 2/2000 | Kujoory et al. |
| 5,901,140 A | 5/1999 | Van As et al. | | 6,023,147 A | 2/2000 | Cargin et al. |
| 5,903,558 A | 5/1999 | Jones et al. | | 6,023,474 A | 2/2000 | Gardner et al. |
| 5,905,736 A | 5/1999 | Ronen et al. | | 6,026,087 A | 2/2000 | Mirashrafi et al. |
| 5,907,547 A | 5/1999 | Foladare et al. | | 6,026,091 A | 2/2000 | Christie et al. |
| 5,910,946 A | 6/1999 | Csapo | | 6,028,858 A | 2/2000 | Rivers et al. |
| 5,912,887 A | 6/1999 | Sehgal | | 6,029,062 A | 2/2000 | Hanson |
| 5,914,481 A | 6/1999 | Danielson et al. | | 6,029,261 A | 2/2000 | Hartmann |
| 5,915,001 A | 6/1999 | Uppaluru | | 6,031,840 A | 2/2000 | Christie et al. |
| 5,915,005 A | 6/1999 | He | | 6,035,028 A | 3/2000 | Ward et al. |
| 5,915,008 A | 6/1999 | Dulman | | 6,036,093 A | 3/2000 | Schultz |
| 5,915,012 A | 6/1999 | Miloslavsky | | 6,041,109 A | 3/2000 | Cardy et al. |
| 5,917,175 A | 6/1999 | Miller et al. | | 6,041,117 A | 3/2000 | Androski et al. |
| 5,917,424 A | 6/1999 | Goldman et al. | | 6,044,081 A | 3/2000 | Bell et al. |
| 5,918,179 A | 6/1999 | Foladare et al. | | 6,046,992 A | 4/2000 | Meier et al. |
| 5,923,659 A | 7/1999 | Curry et al. | | 6,047,051 A | 4/2000 | Ginzboorg et al. |
| 5,926,482 A | 7/1999 | Christie et al. | | 6,047,326 A | 4/2000 | Kilkki |
| 5,928,292 A | 7/1999 | Miller et al. | | 6,049,545 A | 4/2000 | Stephenson et al. |
| 5,930,343 A | 7/1999 | Vasquez | | 6,049,813 A | 4/2000 | Danielson et al. |
| 5,930,700 A | 7/1999 | Pepper et al. | | 6,052,445 A | 4/2000 | Bashoura et al. |
| 5,933,425 A | 8/1999 | Iwata | | 6,052,450 A | 4/2000 | Allison et al. |

| | | |
|---|---|---|
| 6,058,000 A | 5/2000 | Koenck et al. |
| 6,064,653 A | 5/2000 | Farris |
| 6,069,890 A | 5/2000 | White et al. |
| 6,075,783 A | 6/2000 | Voit |
| 6,078,582 A | 6/2000 | Curry et al. |
| 6,078,943 A | 6/2000 | Yu |
| 6,081,525 A | 6/2000 | Christie et al. |
| 6,084,867 A | 7/2000 | Meier |
| 6,084,953 A | 7/2000 | Bardenheuer et al. |
| 6,088,431 A | 7/2000 | LaDue |
| 6,097,804 A | 8/2000 | Gilbert et al. |
| 6,098,094 A | 8/2000 | Barnhouse et al. |
| 6,101,182 A | 8/2000 | Sistanizadeh et al. |
| 6,104,645 A | 8/2000 | Ong et al. |
| 6,104,704 A | 8/2000 | Buhler et al. |
| 6,104,711 A | 8/2000 | Voit |
| 6,108,341 A | 8/2000 | Christie |
| 6,108,704 A | 8/2000 | Hutton et al. |
| 6,112,206 A | 8/2000 | Morris et al. |
| 6,115,458 A | 9/2000 | Taskett |
| 6,115,737 A | 9/2000 | Ely et al. |
| 6,118,936 A | 9/2000 | Lauer et al. |
| 6,122,255 A | 9/2000 | Bartholomew et al. |
| 6,125,113 A | 9/2000 | Farris et al. |
| 6,125,126 A | 9/2000 | Hallenst.ang.l |
| 6,128,304 A | 10/2000 | Gardell et al. |
| 6,131,121 A | 10/2000 | Mattaway et al. |
| 6,134,235 A | 10/2000 | Goldman et al. |
| 6,134,433 A | 10/2000 | Joong et al. |
| 6,134,530 A | 10/2000 | Bunting et al. |
| 6,137,792 A | 10/2000 | Jonas et al. |
| 6,137,869 A | 10/2000 | Voit et al. |
| 6,141,404 A | 10/2000 | Westerlage et al. |
| 6,141,412 A | 10/2000 | Smith et al. |
| 6,144,647 A | 11/2000 | Lopez-Torres |
| 6,144,661 A | 11/2000 | Katsube et al. |
| 6,144,667 A | 11/2000 | Doshi et al. |
| 6,144,976 A | 11/2000 | Silva et al. |
| 6,149,062 A | 11/2000 | Danielson et al. |
| 6,154,445 A | 11/2000 | Farris et al. |
| 6,154,777 A | 11/2000 | Ebrahim |
| 6,157,621 A | 12/2000 | Brown et al. |
| 6,157,636 A | 12/2000 | Voit et al. |
| 6,157,648 A | 12/2000 | Voit et al. |
| 6,157,823 A | 12/2000 | Fougnies et al. |
| 6,163,536 A | 12/2000 | Dunn et al. |
| 6,169,735 B1 | 1/2001 | Allen et al. |
| 6,175,618 B1 | 1/2001 | Shah et al. |
| 6,181,690 B1 | 1/2001 | Civanlar |
| 6,181,695 B1 | 1/2001 | Curry et al. |
| 6,181,703 B1 | 1/2001 | Christie et al. |
| 6,185,184 B1 | 2/2001 | Mattaway et al. |
| 6,185,198 B1 | 2/2001 | LaDue |
| 6,188,677 B1 | 2/2001 | Oyama et al. |
| 6,192,050 B1 | 2/2001 | Stovall |
| 6,192,400 B1 | 2/2001 | Hanson et al. |
| 6,195,425 B1 | 2/2001 | Farris |
| 6,198,738 B1 | 3/2001 | Chang et al. |
| 6,201,812 B1 | 3/2001 | Christie |
| 6,205,139 B1 | 3/2001 | Voit |
| 6,212,162 B1 | 4/2001 | Horlin |
| 6,212,193 B1 | 4/2001 | Christie |
| 6,215,790 B1 | 4/2001 | Voit et al. |
| 6,222,919 B1 | 4/2001 | Hollatz et al. |
| 6,226,273 B1 | 5/2001 | Busuioc et al. |
| 6,226,287 B1 | 5/2001 | Brady |
| 6,226,678 B1 | 5/2001 | Mattaway et al. |
| 6,230,203 B1 | 5/2001 | Koperda et al. |
| 6,233,318 B1 | 5/2001 | Picard et al. |
| 6,233,604 B1 | 5/2001 | Van Horne et al. |
| 6,236,851 B1 | 5/2001 | Fougnies et al. |
| 6,240,091 B1 | 5/2001 | Ginzboorg et al. |
| 6,243,373 B1 | 6/2001 | Turock |
| 6,243,374 B1 | 6/2001 | White et al. |
| 6,252,869 B1 | 6/2001 | Silverman |
| 6,260,067 B1 | 7/2001 | Barnhouse et al. |
| 6,263,372 B1 | 7/2001 | Hogan et al. |
| 6,266,685 B1 | 7/2001 | Danielson et al. |
| 6,278,693 B1 | 8/2001 | Aldred et al. |
| 6,278,704 B1 | 8/2001 | Creamer et al. |
| 6,279,038 B1 | 8/2001 | Hogan et al. |
| 6,282,192 B1 | 8/2001 | Murphy et al. |
| 6,282,281 B1 | 8/2001 | Low |
| 6,282,284 B1 | 8/2001 | Dezonno et al. |
| 6,282,574 B1 | 8/2001 | Voit |
| 6,285,745 B1 | 9/2001 | Bartholomew et al. |
| 6,289,010 B1 | 9/2001 | Voit et al. |
| 6,292,478 B1 | 9/2001 | Farris |
| 6,292,479 B1 | 9/2001 | Bartholomew et al. |
| 6,292,481 B1 | 9/2001 | Voit et al. |
| 6,295,292 B1 | 9/2001 | Voit et al. |
| 6,298,057 B1 | 10/2001 | Guy et al. |
| 6,298,062 B1 | 10/2001 | Gardell et al. |
| 6,298,064 B1 | 10/2001 | Christie |
| 6,298,120 B1 | 10/2001 | Civanlar et al. |
| 6,301,609 B1 | 10/2001 | Aravamudan et al. |
| 6,304,566 B1 | 10/2001 | Schessel |
| 6,304,567 B1 | 10/2001 | Rosenberg |
| 6,310,873 B1 | 10/2001 | Rainis et al. |
| 6,310,941 B1 | 10/2001 | Crutcher et al. |
| 6,314,103 B1 | 11/2001 | Medhat et al. |
| 6,324,264 B1 | 11/2001 | Wiener et al. |
| 6,327,258 B1 | 12/2001 | Deschaine et al. |
| 6,330,250 B1 | 12/2001 | Curry et al. |
| 6,332,023 B1 | 12/2001 | Porter et al. |
| 6,335,927 B1 | 1/2002 | Elliott et al. |
| 6,343,115 B1 | 1/2002 | Foladare et al. |
| 6,347,084 B1 | 2/2002 | Hulyalkar et al. |
| 6,347,085 B2 | 2/2002 | Kelly |
| 6,359,880 B1 | 3/2002 | Curry et al. |
| 6,363,065 B1 | 3/2002 | Thornton et al. |
| 6,363,349 B1 | 3/2002 | Urs et al. |
| 6,373,929 B1 | 4/2002 | Johnson et al. |
| 6,374,302 B1 | 4/2002 | Galasso et al. |
| 6,375,344 B1 | 4/2002 | Hanson et al. |
| 6,381,321 B1 | 4/2002 | Brown et al. |
| 6,385,191 B1 | 5/2002 | Coffman et al. |
| 6,385,193 B1 | 5/2002 | Civanlar et al. |
| 6,400,702 B1 | 6/2002 | Meier |
| 6,407,991 B1 | 6/2002 | Meier |
| 6,430,195 B1 | 8/2002 | Christie et al. |
| 6,430,275 B1 | 8/2002 | Voit et al. |
| 6,438,218 B1 | 8/2002 | Farris et al. |
| 6,449,259 B1 | 9/2002 | Allain et al. |
| 6,449,356 B1 | 9/2002 | Dezonno |
| 6,456,617 B1 | 9/2002 | Oda et al. |
| 6,480,588 B1 | 11/2002 | Donovan |
| 6,493,353 B2 | 12/2002 | Kelly et al. |
| 6,498,788 B1 | 12/2002 | Emilsson et al. |
| 6,501,753 B1 | 12/2002 | Lin et al. |
| 6,513,066 B1 | 1/2003 | Hutton et al. |
| 6,529,516 B1 | 3/2003 | Parzych |
| 6,539,015 B2 | 3/2003 | Voit |
| 6,539,077 B1 | 3/2003 | Ranalli et al. |
| 6,542,497 B1 | 4/2003 | Curry et al. |
| 6,546,003 B1 | 4/2003 | Farris |
| 6,546,005 B1 | 4/2003 | Berkley et al. |
| 6,574,216 B1 | 6/2003 | Farris et al. |
| 6,574,681 B1 | 6/2003 | White et al. |
| 6,584,093 B1 | 6/2003 | Salama et al. |
| 6,594,254 B1 | 7/2003 | Kelly |
| 6,600,733 B2 | 7/2003 | Deng |
| 6,600,735 B1 | 7/2003 | Iwama et al. |
| 6,614,768 B1 | 9/2003 | Mahany et al. |
| 6,614,781 B1 | 9/2003 | Elliott et al. |
| 6,621,942 B1 | 9/2003 | Hacker et al. |
| 6,625,170 B1 | 9/2003 | Curry et al. |
| 6,633,846 B1 | 10/2003 | Bennett et al. |
| 6,643,362 B2 | 11/2003 | Hogan et al. |
| 6,654,357 B1 | 11/2003 | Wiedeman |
| 6,671,285 B1 | 12/2003 | Kirkby et al. |
| 6,678,718 B1 | 1/2004 | Khouri et al. |
| 6,681,994 B1 | 1/2004 | Koenck |
| 6,687,738 B1 | 2/2004 | Hutton et al. |
| 6,688,523 B1 | 2/2004 | Koenck |
| 6,690,788 B1 | 2/2004 | Bauer et al. |
| 6,694,359 B1 | 2/2004 | Morris et al. |
| 6,701,365 B1 | 3/2004 | Hutton et al. |

| Patent Number | Date | Inventor |
|---|---|---|
| 6,704,287 B1 | 3/2004 | Moharram |
| 6,711,241 B1 | 3/2004 | White et al. |
| 6,714,559 B1 | 3/2004 | Meier |
| 6,714,983 B1 | 3/2004 | Koenck et al. |
| 6,735,191 B1 * | 5/2004 | Hosein ............ 370/352 |
| 6,754,181 B1 | 6/2004 | Elliott et al. |
| 6,760,429 B1 | 7/2004 | Hung et al. |
| 6,775,519 B1 | 8/2004 | Wiedeman et al. |
| 6,792,256 B1 | 9/2004 | Kinney et al. |
| 6,798,786 B1 * | 9/2004 | Lo et al. ............ 370/468 |
| 6,810,033 B2 | 10/2004 | Derks |
| 6,823,384 B1 | 11/2004 | Wilson et al. |
| 6,826,165 B1 | 11/2004 | Meier et al. |
| 6,829,645 B1 | 12/2004 | Hutton et al. |
| 6,839,340 B1 | 1/2005 | Voit et al. |
| 6,870,827 B1 | 3/2005 | Voit et al. |
| 6,885,678 B2 | 4/2005 | Curry et al. |
| 6,895,419 B1 | 5/2005 | Cargin et al. |
| 6,910,632 B2 | 6/2005 | Koenck et al. |
| 6,925,054 B1 | 8/2005 | Atterton et al. |
| 6,990,090 B2 | 1/2006 | Meier |
| 7,012,898 B1 | 3/2006 | Farris et al. |
| 7,013,001 B1 | 3/2006 | Felger et al. |
| 7,079,534 B1 | 7/2006 | Medhat et al. |
| 7,085,362 B1 | 8/2006 | Christie et al. |
| 7,088,705 B2 | 8/2006 | Curry et al. |
| 7,092,379 B1 | 8/2006 | Singh et al. |
| 7,120,319 B2 | 10/2006 | Danielson et al. |
| 7,145,898 B1 | 12/2006 | Elliott |
| 7,149,208 B2 | 12/2006 | Mattaway et al. |
| 7,170,887 B2 | 1/2007 | Rosenberg |
| 7,206,592 B1 | 4/2007 | Gollnick et al. |
| 7,236,575 B2 | 6/2007 | Kim et al. |
| 7,260,060 B1 | 8/2007 | Abaye et al. |
| 7,274,662 B1 * | 9/2007 | Kalmanek et al. ............ 370/230 |
| 7,286,562 B1 | 10/2007 | Vargo et al. |
| 7,295,830 B2 | 11/2007 | Lippelt |
| 7,359,972 B2 | 4/2008 | Jorgensen |
| 7,492,886 B1 | 2/2009 | Kalmanek et al. |
| 7,502,339 B1 | 3/2009 | Pirkola et al. |
| 7,693,062 B2 * | 4/2010 | Perkins et al. ............ 370/235 |
| 7,948,968 B2 | 5/2011 | Voit et al. |
| 2002/0006137 A1 * | 1/2002 | Rabenko et al. ............ 370/466 |
| 2002/0064149 A1 | 5/2002 | Elliott et al. |
| 2002/0067739 A1 | 6/2002 | Wilkes et al. |
| 2002/0083166 A1 | 6/2002 | Dugan et al. |
| 2002/0114324 A1 | 8/2002 | Low et al. |
| 2002/0159461 A1 | 10/2002 | Hamamoto et al. |
| 2003/0078006 A1 | 4/2003 | Mahany |
| 2003/0112767 A1 | 6/2003 | Meier |
| 2003/0169767 A1 | 9/2003 | Christie et al. |
| 2003/0189941 A1 | 10/2003 | Christie et al. |
| 2003/0193933 A1 | 10/2003 | Jonas et al. |
| 2003/0198218 A1 | 10/2003 | Farris et al. |
| 2003/0198335 A1 | 10/2003 | Porter et al. |
| 2004/0005046 A1 | 1/2004 | Deo et al. |
| 2004/0018851 A1 | 1/2004 | Koenck et al. |
| 2004/0023651 A1 | 2/2004 | Gollnick et al. |
| 2004/0038717 A1 | 2/2004 | Mahany et al. |
| 2004/0039846 A1 | 2/2004 | Goss et al. |
| 2004/0044667 A1 | 3/2004 | Mahany et al. |
| 2004/0073933 A1 | 4/2004 | Gollnick et al. |
| 2004/0090952 A1 | 5/2004 | Kubler et al. |
| 2004/0093363 A1 | 5/2004 | Cargin et al. |
| 2004/0114567 A1 | 6/2004 | Kubler et al. |
| 2004/0125753 A1 | 7/2004 | Mahany et al. |
| 2004/0131018 A1 | 7/2004 | Johnson et al. |
| 2004/0145775 A1 | 7/2004 | Kubler et al. |
| 2004/0146020 A1 | 7/2004 | Kubler et al. |
| 2004/0146037 A1 | 7/2004 | Kubler et al. |
| 2004/0151150 A1 | 8/2004 | Kubler et al. |
| 2004/0151151 A1 | 8/2004 | Kubler et al. |
| 2004/0151164 A1 | 8/2004 | Kubler et al. |
| 2004/0160912 A1 | 8/2004 | Kubler et al. |
| 2004/0160913 A1 | 8/2004 | Kubler et al. |
| 2004/0162889 A1 | 8/2004 | Morris et al. |
| 2004/0165573 A1 | 8/2004 | Kubler et al. |
| 2004/0165793 A1 | 8/2004 | Hacker et al. |
| 2004/0166895 A1 | 8/2004 | Koenck et al. |
| 2004/0169583 A1 | 9/2004 | Meier |
| 2004/0174841 A1 | 9/2004 | Kubler et al. |
| 2004/0174842 A1 | 9/2004 | Kubler et al. |
| 2004/0174843 A1 | 9/2004 | Kubler et al. |
| 2004/0203834 A1 | 10/2004 | Mahany |
| 2004/0246940 A1 | 12/2004 | Kubler et al. |
| 2004/0264442 A1 | 12/2004 | Kubler et al. |
| 2005/0008002 A1 | 1/2005 | Kubler et al. |
| 2005/0013266 A1 | 1/2005 | Kubler et al. |
| 2005/0021713 A1 | 1/2005 | Dugan et al. |
| 2005/0036467 A1 | 2/2005 | Kubler et al. |
| 2005/0078647 A1 | 4/2005 | Meier et al. |
| 2005/0083872 A1 | 4/2005 | Kubler et al. |
| 2005/0087603 A1 | 4/2005 | Koenck et al. |
| 2005/0191989 A1 | 9/2005 | Plush et al. |
| 2005/0195859 A1 | 9/2005 | Mahany |
| 2005/0232213 A1 | 10/2005 | Meier |
| 2005/0242192 A1 | 11/2005 | Koenck et al. |
| 2005/0254475 A1 | 11/2005 | Kubler et al. |
| 2006/0007951 A1 | 1/2006 | Meier |
| 2006/0062240 A1 | 3/2006 | Meier |
| 2006/0131420 A1 | 6/2006 | Koenck et al. |
| 2006/0233161 A1 | 10/2006 | Koenck et al. |
| 2006/0251226 A1 | 11/2006 | Hogan et al. |
| 2006/0268806 A1 | 11/2006 | Meier et al. |
| 2006/0268807 A1 | 11/2006 | Meier |
| 2006/0274732 A1 | 12/2006 | Allen et al. |
| 2006/0274735 A1 | 12/2006 | Allen et al. |
| 2006/0291752 A1 | 12/2006 | Hacker et al. |
| 2007/0001007 A1 | 1/2007 | Koenck et al. |
| 2007/0007353 A1 | 1/2007 | Danielson et al. |
| 2007/0065046 A1 | 3/2007 | Hacker et al. |
| 2007/0076687 A1 | 4/2007 | Low et al. |
| 2007/0086445 A1 | 4/2007 | Mattaway et al. |
| 2007/0121529 A1 | 5/2007 | Meier |
| 2007/0121591 A1 | 5/2007 | Donovan |
| 2007/0201515 A1 | 8/2007 | Lewis |
| 2007/0206576 A1 | 9/2007 | Radulovic |
| 2007/0263644 A1 | 11/2007 | Christie et al. |
| 2008/0013531 A1 | 1/2008 | Elliott et al. |
| 2008/0063161 A1 | 3/2008 | Joyce et al. |
| 2009/0022147 A1 | 1/2009 | Farris et al. |
| 2011/0004808 A1 * | 1/2011 | Anandakumar et al. ...... 714/776 |

FOREIGN PATENT DOCUMENTS

| | | |
|---|---|---|
| EP | 0365885 | 5/1990 |
| EP | 0381365 | 8/1990 |
| EP | 0559979 | 9/1993 |
| EP | 0729281 | 2/1995 |
| EP | 0767568 | 10/1995 |
| EP | 0802690 | 4/1996 |
| EP | 0722237 | 7/1996 |
| EP | 0781016 | 6/1997 |
| EP | 0812089 | 12/1997 |
| EP | 0823809 | 2/1998 |
| JP | 09-168051 | 6/1997 |
| JP | 09-168063 | 6/1997 |
| JP | 09-168064 | 6/1997 |
| JP | 09-168065 | 6/1997 |
| JP | 09-172459 | 6/1997 |
| JP | 09-172462 | 6/1997 |
| WO | 91/07839 | 5/1991 |
| WO | 94/11813 | 5/1994 |
| WO | 94/11873 | 5/1994 |
| WO | 95/22221 | 8/1995 |
| WO | 95/29564 | 11/1995 |
| WO | 96/20448 | 7/1996 |
| WO | 96/20553 | 7/1996 |
| WO | 96/32800 | 10/1996 |
| WO | 96/34341 | 10/1996 |
| WO | 96/38018 | 11/1996 |
| WO | 97/14238 | 4/1997 |
| WO | 97/20424 | 6/1997 |
| WO | 97/22211 | 6/1997 |
| WO | 97/23078 | 6/1997 |
| WO | 97/28628 | 8/1997 |
| WO | 97/33412 | 9/1997 |

| | | |
|---|---|---|
| WO | 98/12860 | 3/1998 |
| WO | 98/23080 | 5/1998 |
| WO | 98/34391 | 8/1998 |

OTHER PUBLICATIONS

Miller, Mark A., "Troubleshooting TCP/IP: Analyzing the Protocols of the Internet," M.and.T Books, pp. 365-389, 1992.

Platt, Richard, "Why IsoEthernet Will Change the Voice and Video Worlds," IEEE Communications Magazine, pp. 55-59, Apr. 1996.

Quicklook, "Internet by Satellite," 1 page, http://www.netsatx.net, at least as early as 1990.

Rosalyn, Retkwa, "Telephone Politics," Internet World, Jun. 1996.

Schreyer, Oliver, et al., "Least Cost Call Routing—A Brilliant Application for Private IN," IEEE International Conference on Communications, vol. 2 of 3, Jun. 23-27, 1996.

Rodriguez Serrano, Inma, "Evolution of a Hybrid Fibre Coaxial Network for Multimedia Interactive Services," British Telecommunications Egineering, vol. 15, pp. 249-253, Oct. 1996.

Sunaga, Hiroshi, et al., "A Reliable Communication Switching Platform for Quick Service Provisioning," IEEE International Conference on Communications, Seattle, WA, Jun. 18-22, 1995.

Marketing materials re: Workshops on "Telephony on the Internet," to take place on Sep. 24-25, 1996, at The Drake Hotel, Chicago, Illinois.

Gralla, Preston, "How the Internet Works," Ziff-Davis Press, pp. 118-119, 1996.

Gralla, Preston, "How the Internet Works," Ziff-Davis Press, pp. 64-67, 1996.

Tsuchida, Hisazumi, et al., "Intelligent Dynamic Service Provisioning Architecture in the Multimedia Era," NTT Information and Communication Systems Laboratories, IEEE, pp. 1117-1122, 1996.

Low, Colin, "Integrating Communication Services," IEEE Communications Magazine, pp. 164-169, Jun. 1997.

Fridisch, M., et al., "Terminals for Accessing the Internet—The Internet Telephone," Alcatel Telecommunications Review, 4th Quarter, pp. 304-309, 1996.

Hurwicz, Michael, "Switched ATM is fast, but not that smart. Routed IP is smart, but not that fast. Why not combine them?," http://www.ipsilon.com/, Apr. 1997.

Diehl, Standford, "Data's New Voice," BYTE, Special Report, pp. 129-135, Sep. 1996.

Kahn, Jeffery, "Videoconferencing Debuts on the Internet," LBL, U.S. Department of Energy, Berkeley, California, University of California, Feb. 28, 1995.

Braun, Hans-Werner, et al., "A framework for flow-based accounting on the Internet," National Science Foundation (NCR-9119473), downloaded, Aug. 21, 2008.

Kelly, Katy, "Up to their laptops in packed powder: Mountaintop office keeps skiers in touch," USA Today, Final Edition, News, pp. 1A, Feb. 21, 1997.

Braun, Torsten, "Implementation of an Internet Video Conferencing Application over ATM," IBM European Networking Center, Heidelberg, Germany, IEEE, pp. 287-294, 1997.

Sclavos, Jean, et al., "Information Model: From Abstraction to Application," Telecom Paris, France, pp. 1-13, downloaded, Aug. 21, 2008.

Black, Uyless D., "OSI: A model for computer communications standards," Prentice-Hall, Inc., pp. 157-201, 1991.

Sriram, Kotikalapudi, et al., "Voice Packetization and Compression in Broadband ATM Networks," IEEE Journal on Selected Areas in Communications, vol. 9, No. 3, pp. 294-304, Apr. 1991.

Arango, Mauricio, et al., "Guaranteed Internet Bandwith," IEEE, pp. 862-866, Nov. 18, 1996.

Lapolla, Stephanie, "Seagate joins the backup vendors' enterprise forays," PC Week, The National Newspaper of Corporate Computing, vol. 13, No. 33, Aug. 19, 1996.

Harmer, Julie, et al., "Revised Requirements for Mobile-API-Interim deliverable," OnTheMove public project, pp. 1-44, Dec. 1996.

Schulzrinne, Henning, "Personal Mobility for Multimedia Services in the Internet," IDMS '96 (European Workshop on Interactive Distributed Multimedia Systems and Services), Berlin, Germany, pp. 1-18, Mar. 4-6, 1996.

Schulzrinne, "Simple Conference Invitation Protocol," Internet Engineering Task Force, pp. 1-19, Feb. 22, 1996.

Ash, G.R., et al., "Design and Optimization of Networks With Dynamic Routing," American Telephone and Telegraph Company, The Bell System Technical Journal, vol. 60, No. 8, pp. 1787-1820, Oct. 1981.

Prosecution history of U.S. Patent No. 6,332,023, Issued, Dec. 18, 2001.

The Phone Zone, an online reference cite and catalog of PC based telephony and networking solution for business, http://www.phonezone.com/index2.htm, Oct. 29, 1996.

"IDT's Net2Phone Launches Phone-to-Phone Technology Via The Internet," Press release, http://web.net2phone.com/about/press/releases/p2p.asp, Sep. 8, 1997.

"Vocaltec's telephony gateway—the ultimate internet telephony solution?," Computer Telephony, pp. 30, Sep. 1996.

Cheriton, David R., "Dissemination-Oriented Communication Systems: Final Report," ARPA contract No. DABT63-91-K-0001, Nov. 26, 1996.

Johnson, David B., "Scalable Support for Transparent Mobile Host Internetworking," Proceedings of the Ninth Annual IEEE Worshop on Computer Communications, pp. 1-10, Oct. 1994.

"Specifications of Signalling System No. 7," International Telecommunication Union, ITU-T Telecommunication Standardization Sector of ITU, Recommendation, Q.700, Mar. 1993.

"Integrated Services Digital Network (ISDN) I.312," CCITT The International Telegraph and Telephone Consultative Committee, ITU International Telecommunication Union, Recommendation, I.312/Q.1201, Oct. 1992.

"Interface Recommendation for Intelligent Network CS-1," International Telecommunication Union, ITU-T Telecommunication Standardization Sector of ITU, ITU-T Recommendation Q.1218, Oct. 1995.

"Series Q: Switching and Signalling," Intelligent Network, International Telecommunication Union, ITU-T, Telecommunication Standardization Sector of ITU, Recommendation Q.1218—Addendum 1, Sep. 1997.

Imielinski, Tomasz, et al., "Mobile Wireless Computing: Solutions and Challenges in Data Management," Department of Computer Science, Rutgers University, downloaded, Oct. 22, 2008.

Balmer, R., et al., "A Concept for RSVP Over DiffServ," Institute of Computer Science and Applied Mathematics, University of Berne, Switzerland, http://www.iam.unibe.ch/~rvs, pp. 412-417, IEEE, May 2000.

Ziegler, Jr., K., "A Distributed Information System Study," IBM Syst J, vol. 18, No. 3, pp. 374-401, 1979.

Blake, S., et al., "An Architecture for Differentiated Services," Network Working Group, pp. 1-36, Dec. 1998.

Walters, Rob, "Computer Telephony Integration," Second Edition, Artech House, 1999.

IMTC Voice over IP Forum Service Interoperability Implementation Agreement, Draft 0.91, IMTC Voice over IP Forum Technical Committee, VoIP97-008, Jan. 13, 1997.

Braden, R., et al., "Integrated Services in the Internet Architecture: an Overview," Network Working Group, pp. 1-28, Jul. 1994.

Braun, Torsten, "Internet Protocols for Multimedia Communications," Part II: Resource Reservation, Transport, and Application Protocols, IEEE MultiMedia, pp. 74-82, Oct.-Dec. 1997.

Black, Uyless D., "Internet Telephony Call Processing Protocols," Prentice Hall PTR, www.phptr.com, 2001.

Briere, Daniel D., et al., "Internet Telephony for Dummies," 2nd Edition, IDG Books Worlwide, Inc., 1997.

Vin, Harrick M., et al., "Multimedia Conferencing in the Etherphone Environment," Xerox Palo Alto Research Center, IEEE, pp. 69-79, Oct. 1991.

Detti, Andrea, et al., "Supporting RSVP in a Differentiated Service Domain: an Architectural Framework and a Scalability Analysis," http://www-st.inf.tu-dresden.de/elisa/, downloaded, Oct. 27, 2008.

Bernet, Yoram, "The Complementary Roles of RSVP and Differentiated Services in the Full-Service QoS Network," QoS Mechanisms, Microsoft, downloaded, Oct. 27, 2008.

Herzog, S., et al., "COPS Usage for RSVP," Network Working Group, pp. 1-15, Jan. 2000.

Sebestyen, Istvan, "What is the position of Q.2, Q.3/15 on Internet Telephony for the IMTC—VoIP Forum Meeting in Seattle," ITU Telecommunication Standardization Sector, Study Group 15, pp. 1-5, Dec. 5, 1996.

Daniele, M., et al., "Textual Conventions for Internet Network Addresses," Nework Working Group, pp. 1-16, Jun. 2000.

Handley, M., et al., "SIP: Session Initiation Protocol," Internet Engineering Task Force, pp. 1-30, Dec. 2, 1996.

Weinstein, Clifford J., "The Experimental Integrated Switched Network—a System-Level Network Test Facility," IEEE, pp. 449-456, Jan. 1983.

"Computer Telephony and the Internet," pp. 1-8, downloaded, Jul. 14, 2009.

Jitian, Xiao, et al., "Sharing Model of Netware Node Resources and Real-Time Scheduling," Mini-Micro Systems, vol. 16, No. 12, pp. 54-59, Dec. 1995.

Swinehart, D.C. et al., "Adding Voice to an Office Computer Network", IEEE GLOBECOM '83 Conference Record, vol. 1, Nov. 28, 1983, p. 392-398.

Vijay K. Varma et al., "Architecture for Interworking Data over PCS," IEEE Communications Magazine, Sep. 1996, 124-130.

Jonathan Rosenberg et al., "SIP for Presence," 41st IETF, Apr. 3, 1998.

Overview, NetSpeak Corporation, Apr. 8, 1997, printed from Edgar Online.

NetSpeak Corporation to Exhibit First Release of Voice Over IP, IP-to-PSTN Networking Products, Business Wire, Jun. 2, 1997.

Handley et al., "Session Invitation Protocol", Internet Engineering Task Force, draft-ietf-mmusic-sip-00, Feb. 22, 1996.

Camelot Announces Internet Voice Communication Technology Breakthrough, HighBeamTM Encyclopedia, From: PR Newswire, http://www.encyclopedia.com/doc/1G1-16452259.html?Q=Caml, Feb. 13, 1995, 2 pages.

1979 Annual Technical Report, "A Research Program in Computer Technology", Oct. 1978-Sep. 1979, Prepared for the Defense Advanced Research Projects Agency, University of Southern California, ISI-SR-80-17.

Cohen et al., "A Network Voice Protocol NVP-11", Lincoln Laboratory Massachusetts Institute of Technology, Apr. 1, 1981, ISI/RR-81-90.

1982 Annual Technical Report, "A Research Program in Computer Technology", Jul. 1981-Jun. 1982, University of Southern California, ISI/SR-83-23.

Annual Report to the Defense Communications Agency, "Network Speech Systems Technology Program", Massachusetts Institute of Technology Lincoln Laboratory, Oct. 1, 1980-Sep. 30, 1981, issued Feb. 4, 1982.

Heggestad et al., "Voice and Date Communication Experiments on a Wideband Satellite/Terrestrial Internetwork System", IEEE International Conference on Communications, Integrating Communication for World Progress, Jun. 19-22, 1983.

Annual Report to the Defense Communications Agency, "Defense Switched Network Technology and Experiments Technology", Massachusetts Institute of Technology Lincoln Laboratory, Oct. 1, 1981-Sep. 30, 1982, issued Feb. 5, 1983.

Merritt, "Providing Telephone Line Access to a Packet Voice Network", University of Southern California, Feb. 1983, ISI/RR-83-107.

Weinstein, "The Experimental Integrated Switched Networks—A System Level Network Text Facility", Proceedings of 1983 IEE Military Communications Conference, Washington, DC, Oct. 31-Nov. 2, 1983.

Cesner et al., "Wideband Communications", 1984 Annual Technical Report, University of Southern California, ISI/SR-85-150, Jul. 1983-Jun. 1984.

Annual Report to the Defense Communications Agency, "Defense Switched Network Technology and Experiments Technology", Massachusetts Institute of Technology Lincoln Laboratory, Oct. 1, 1982-Sep. 30, 1983, issued Feb. 29, 1984.

Gross, "Proceedings of the Oct. 15-17, 1988 Joint Meeting of the Internet Engineering and Internet Architecture Task Forces", Fourth IETF, The Mitre Corporation.

Corley, "Bellsouth Trial of Wideband Packet Technology", Bellsouth Services, 1990 IEEE, CH2829-0/90/0000-1000.

Inoue et al., "Evolution Scenario of Broadband Services Based on Granulated Broadband Network Concept", IEEE Region 10 Conference, Tencon 92, Nov. 11-13, 1992.

Inoue et al., "Granulated Broadband Network Applicable to B-ISDN and PSTN Services", IEEE Journal on Selected Areas in Communiations, vol. 10, No. 9, Dec. 1992.

Cert et al., "A Protocol for Packet Network Intercommunication", IEEE Transactions on Communications, No. 8, May 1974.

Cole, "Dialing in the WB Network", Information Sciences Institute University of Southern California, Dialing-Cole.83, Apr. 30, 1981.

Hapgood, "Dialing Without Dollars", Jul. 1995, vol. 17, No. 4, pp. 18, Journal Code, INO.

Yang, "INETPhone: Telephone Services and Servers on Internet", Network Working Group, RFC 1798, Apr. 1995, http://ds.internic.net/rfc/rfc1798.txt.

Chen et al., "Integrated Voice/Data Switching", IEEE Communication Magazine, Jun. 1988, vol. 26, No. 6.

Frezza, "The Internet Phone is Poised to Conquer", Communications Week, Dec. 11, 1995, http://techweb.cmp.com/cw/current.

Internet Access: Internet Phone-to-Phone Technology Now a Reality . . . , Edge Publishing, Aug. 12, 1996.

Internet Phone Saves 50% on Long Distance, 411 Newsletter, Aug. 5, 1996, vol. 17, No. 15, United Communications Group.

Internet Phone Calls are Cheap but Limited, New Media Markets, Feb. 23, 1995, Financial Times Business Information, Ltd., ISSN:0265-4717.

Internet Telephony Seems to be Evolving East, But is There Anyone on the Line?, Computergram International, Aug. 19, 1996, No. 2980, ISSN: 0268-716X.

Internet's International Phone Calls are Cheap But Limited, Telecom Markets, Financial Times Business Information ID, Mar. 2, 1995, ISSN: 0267-1484.

Mills, The Washington Post, "Phone Service Via the Internet May Slash Rates", Aug. 11, 1996.

Sears, "The Effect of Internet Telephone of the Long Distance Voice Market", Jan. 14, 1995.

National Technical Information Service, Wideband Integrated Voice/Data Technology, ADA132284, Mar. 31, 1983, Massachusetts Inst. of Tech., Lexington, Lincoln Lab.

Detreville et al., "A Distributed Experimental Communications System", Advances in Local Area Networks, IEEE Press, 1987.

Borden et al., "Integration of Real-Time Services in an IP-ATM Network", Internet RFC/STD/FYI/BCP ARchives, Aug. 1995.

Laubach, "Classical IP and ARP over ATM" Hewlett-Packard Laboratories, Jan. 1994, http://www.faqs.org/rfc/rfc1577.txt.

Corner, "Internetworking with TCP/IP", vol. 1, Principles, Protocols, and Architecture, Department of Computer Sciences, 1995.

Perez et al., "ATM Signaling Support for IP Over ATM", Network Working Group, RFC 1765, Feb. 1995, http:/www.ietf.org/rfc/rfc1765.txt.

Zellweger, Polle T., et al., "An overview of the etherphone system and its applications," Xerox Palo Alto Research Center, pp. 160-168, Apr. 1988.

Ng, L.J., et al., "Distributed architectures and databases for intelligent personal communication networks," Department of Electrical Engineering, U. of British Columbia, pp. 300-304, Feb. 1992.

Malyan, Andrew D., et al., "Network architecture and signaling for wireless Personal communications," IEEE Journal on Selected Areas in Communications, vol. 11, No. 6, pp. 830-841, Aug. 1993.

Malyan, Andrew D., et al. "A Microcellular Interconnection Architecture For Personal Communications Networks," Department of Electrical Engineering, University of British Columbia Vancouver, B.C., V6T 1W.5, Canada, pp. 502-505, Feb. 1992.

Bakre, Ajay, et al., "M-RPC: A Remote Procedure Call Service for Mobile Clients," Department of Computer Science Rutgers, The State University of New Jersey Piscataway, NJ, pp. 97-110, 1995.

O'Malley, Sean W., "A Dynamic Network Architecture," Department of Computer Science, University of Arizona, ACM Transactions on computer systems, vol. 10, No. 2, pp. 110-143, May 1992.

Cheshire, Stuart, et al., "Internet Mobility 4 by 4," SIGCOMM 96—Stanford, California, USA, pp. 1-2, Aug. 1996.

Chang, Rong N., et al., "A Service Acquisition Mechanism for the Client/Service Model in Cygnus," IBM Canada Laboratory Technical Report TR 74.059, pp. 323-345.

Arao, Shinya, et al., "Component-based policy deployment for service level differentiation in converging communication networks," IEEE, pp. 1388-1392, 1999.

Goyal, Pawan, et al., "Integration of call signaling and resource management for IP telephony," IEEE Network, pp. 24-32, May/Jun. 1999.

Delatore, J.P., et al., "The 5ESS switching system: Fatory system testing," AT+T Technical Journal, vol. 64, No. 6, Jul.-Aug. 1985.

Mills, M. (Jan. 23, 1996) "It's the Net's Best Thing to Being There: With Right Software, Computer Becomes Toll-Free Telephone", The Washington Post, sec. C, pp. 1,5.

Welcome to the Phone Zone, Pacific Telephony Design, http://www.phonezone.com/index2.htm, pp. 1-6.

Computer Telephony And The Internet, Stylus Innovation, http://www.stylus.com/hvml.htm.

Lougheed et al., "A Border Gateway Protocol (BGP)", Jun. 1990, http://www.internic.net/rfc/rfc1163.txt, pp. 1-26.

S. Deering, "Host Extensions for IP Multicasting", Aug. 1989, http://www.internic.net/rfc/rfc1112.txt, pp. 1-16.

Sebestyn, I., ITU Telecommunication Standardization Sector, Study Group 15, Q;2.and.3/15 Rapporteur Meeting, Document AVC-1086, v1, Dec. 5, 1996.

Schulzrinne, Henning, et al., "Interaction of Call Setup and Resource Reservation Protocols in Internet Telephony," pp. 1-13, Jun. 11, 1999, downloaded, Aug. 21, 2008.

Rosen, E., et al., "Memo re: BGP/MPLS VPNs," Networking Group, pp. 1-25, Mar. 1999.

Waksberg, M., "Axe 10 and the Intelligent Network," Commutation .and. Transmission, No. 4, pp. 67-76, Dec. 1993.

Niitsu, Yoshihiro, et al., "Computer-aided stepwise service creation environment for intelligent network," NTT Communication Switching Laboratories, Tokyo, Japan, IEEE, pp. 454-458, 1992.

Morgan, Michael J., et al., "Service creation technologies for the intelligent network," At.and.t Technical Journal, Summer 1991.

Fujioka, Masanobu, et al., "Universal service creation and provision environment for intelligent network," XIII International Switching Symposium, Stockholm, Sweden, Proceedings vol. III, pp. 149-156, May 27-Jun. 1, 1990.

Moy, J., "OSPF Version 2," Network Working Group, Proteon, Inc., Jul. 1991.

Lantz, Keith A., "Towards a universal directory service," Operating Systems Review, vol. 20, No. 2, Apr. 1986.

Fang, Wenjia, "Building An Accounting Infrastructure for the Internet," Princeton University, IEEE, pp. 105-109, 1996.

Aidarous, Salah, et al., "The role of the element management layer in network management," 1994 IEEE Network Operations and Management Symposium, Feb. 14-17, 1994.

Gareiss, Robin, "Voice over the internet," Data Communications, pp. 93-100, Sep. 1996.

Bethoney, Herb, "HAHTSite Gives Pros Everything They Need," PC Week, p. 36, Mar. 10, 1997.

Kolarov, Aleksandar, et al., "End-to-end Adaptive Rate Based Congestion Control Scheme for ABR Service in Wide Area ATM Networks," IEEE International Conference on Communications, Seattle, Washington, pp. 138-143, Feb. 1995.

Chen, Larry T., et al., "ATM and Satellite Distribution of Multimedia Educational Courseware," 1996 IEEE International Conference on Communications, pp. 1133-1137, Jun. 23-27, 1996.

Civanlar, M. Reha, et al., "FusionNet: Joining the Internet .and. Phone Networks for Multimedia Applications," ACM Multimedia 96, pp. 431-432, 1996.

Cobbold, Christopher, et al., "Enhancement for Integrated Wireless Personal Communications over Metropolitan Area Networks," 1996 IEEE International Conference on Communications, pp. 1370-1376, Jun. 23-27, 1996.

Comer, Douglas E., "Internetworking With TCP/IP," 3rd ed., V. 1. Principles, protocols, and architecture, Prentice-Hall, Inc., 1995.

Mahadevan, I., et al., "Quality of service achitectures for wireless networks: IntServ andDiffServ models," http://ieeexplore.ieee.org/xpllabsprintf.jsp?arnumber==778974.and.page..., Aug. 6, 2002.

Ahmadi, H., et al., "NBBS Traffic management overview," IBM Systems Journal, vol. 34, No. 4, pp. 604-628, 1995.

Stoica, Ion, et al., "LIRA: An Approach for Service Differentiation in the internet," sponsored by DARPA under contract Nos. N66001-96-C-8528 and NOOI74-96-K-0002, and by a NSF Career Award under grant No. NCR-9624979. Additional support was provi.

Duan, Juan, et al., "Efficient Utilization of Multiple Channels between two Switches In ATM Networks," IEEE, pp. 1906-1911, 1995.

Ejiri, Masayoshi, et al., "For Whom the Advancing service/network management," IEEE, pp. 422-433, 1994.

Lee, Whay Chiou, et al., "Integrated Packet Networks With Quality of Service Constraints," Globecom, IEEE, pp. 8A.3.1-8A.3.5, 1991.

Elia, Carlo, et al., "Skyplex: Distributed Up-link for Digital Television via Satellite," IEEE Intelligent Network workshop IN, Melbourne, Australia, Apr. 21-24, 1996.

Ely, Tom, "The Service Control Point as a Cross Network Integrator," Bellcore, IEEE, pp. 1-8, 1996.

Mamais, G., et al., "Efficient buffer management and scheduling in a combined IntServand DiffServ architecture: a performance study," ATM, 1999. ICATM '99. 1999 2nd International Conference on, pp. 236-242, Jun. 21-23, 1999.

Baumgartner, F., et al., "Differentiated services: a new approach for quality of service in the Internet," Proceedings of Eighth International Conference on High Performance Networking, pp. 255-273, Sep. 21-25, 1998.

Sibal, Sandeep, et al., "Controlling Alternate Routing in General-Mesh Packet Flow Networks," SIGCOMM 1994, London, England, pp. 168-179, Aug. 1994.

Jajszczyk, A., et al., "Bringing information to People," IEEE INFOCOM '95, Proceedings, vol. 3, Apr. 2-6, 1995.

CT and the 'Net, "Webphone," Computer Telephony pp. 219-221, Mar. 1996.

Sisalem, Dorgham, et al., "The Network Video Terminal," IEEE Proceedings of HPDC-5, pp. 3-10, 1996.

Baumgartner, H., et al., "Middleware for a New Generation of Mobile Networks: The ACTS OnTheMove Project," http://www.isoc.org/inet96/proceedings/a6/a6_3.htm, pp. 1-4, Apr. 14, 2008.

"Talk Talk," tele.com, pp. 68-72, Jun. 1996.

Kreller, Birgit, et al., "UMTS: A Middleware Architecture and Mobile API Approach," IEEE Personal Communications, pp. 32-38, Apr. 1998.

Low, Colin, et al., "WebIN—An Architecture for Fast Deployment of IN-based Personal Services," IEEE, 1996.

Grami, A., et al., "The Role of Satellites in the Information Superhighway," IEEE International Conference on Communications, pp. 1577-1581, Jun. 18-22, 1995.

Gupta, Ranabir, et al., "Technical Assessment of (T)INA—TMN—OSI Technology for Service Management Applications," IEEE Network Operations and Management Symposium, vol. 3, pp. 877-887, Feb. 14-17, 1994.

Inamori, Hisayoshi, et al., "Applying TMN to a Distributed Communications Node System with Common Platform Software," NTT Network Service Systems Laboratories, Tokyo, Japan, pp. 83-87, IEEE International Conference on Communications, Seattle, WA, Jun. 18.

Clark, David D., et al., "Supporting Real-Time Applications in an Integrated Services Packet Network: Architecture and Mechanism," COMM'92, MD, USA, pp. 14-26, Aug. 1992.

Peeren, Rene, "IN in the Hybrid Broadband Network The Intelligent Web," Presentation, Ericsson, IEEE 1996.

Jain, Surinder K., "Evolving Existing Narrowband Networks Towards Broadband Networks with IN Capabilities," Bellcore Intelligent Networks, IEEE, Apr. 22, 1996.

Matta, Ibrahim, et al, "Type-of-Service Routing in Dynamic Datagram Networks," Department of Computer Science, University of Maryland, pp. 992-999, IEEE 1994.

Yeager, Nancy J., et al., "Web Server Technology: The Advanced Guide for World Wide Web Information Providers," National Center for Supercomputing Applications, pp. 250, Morgan Kaufman Publishers, Inc., 1996.

Kishimoto, Ryozo, "Agent Communication System for Multimedia Communication Services," IEEE INFOCOM, Fifteenth Annual Joint Conference of the IEEE Computer and Communications Societies, pp. 10-17, Mar. 24-28, 1996.

Willebeek-LeMair, Marc H., "Videoconferencing over Packet-Based Networks," IEEE Journal on Selected Areas in Communications, vol. 15. No. 6, pp. 1101-1114, Aug. 1997.

Kumar, Vinay, "Internet Multicasting: Internet's Next Big Thing," ICAST Corporation, pp. 1-13, Sep. 23, 1997.

The Wall Street Journal article on: "MCI's New Service for Corporate Use Sets 1 Line for Net, Phone," pp. B16, Jan. 30, 1997.

Sharp, C.D., et al., "Advanced Intelligent Networks—now a reality," Electronics .and. Communication Engineering Journal, pp. 153-162, Jun. 1994.

Pezzutti, David A., "Operations Issues for Advanced Intelligent Networks," IEEE Communications Magazine, pp. 58-63, Feb. 1992.

Oppen, Derek C., et al., "The Clearinghouse: A Decentralized Agent for Locating Named Objects in a Distributed Environment," ACM Transactions on Office Information Systems, vol. 1, No. 3, Jul. 1983, pp. 230-253.

Kumar, Vijay P., et al., "Beyond Best Effort: Router Architectures for the Differentiated Services of Tomorrow's Internet," IEEE Communications Magazine, pp. 152-164, May 1998.

Pan, Ping, et al., "Diameter-SIP," Internet Draft, pp. 1-15, Nov. 15, 1998.

Neilson, Rob, et al., "A Discussion of Bandwidth Broker Requirements for Internet2 Qbone Deployment," Internet2 Qbone BB Advisory Council, Version 0.7, pp. 1-30, Aug. 1999.

Stojsic, Goran, et al., "Formal Definition of SIP Proxy Behavior," IEEE, pp. 289-292, Feb. 2001.

Bhuyan, L., et al., "Impact of switch Design on the Application Performance of Cache-Coherent Multiprocessors," Dept. of Computer Science, Texas A.and.M University and Intel Corp., pp. 1-9, Nov. 15, 2005.

Product Overview, "IP Highway product overview," http://iphighway.com/prod/, pp. 1-4, Sep. 22, 1999.

Rosenberg, Jonathan, et al., "Internet telephony gateway location," IEEE, pp. 488-496, Feb. 1998.

Wright, S., et al., "IP "Telephony" vs. ATM: What is There to Discuss?," IEEE, pp. 400-409, Feb. 1998.

Wedlund, Elin, et al., "Mobility support using SIP," WoWMoM, Jan. 1999.

Aiken, B., et al., "Network Policy and Services: A report of a Workshop on Middleware," Network Working Group, pp. 1-26, Feb. 2000.

Aspnes, James, et al., "On-Line Routing of Virtual Circuits willi Applications to Load Balancing and Machine Scheduling," pp. 486-504, Journal of the ACM, vol. 44, No. 3, May 1997.

Salsano, Stefano, et al., "QoS Control by Means of COPS to Support SIP-Based Applications," IEEE Network, Mar./Apr. 2007.

White, Paul P., "RSVP and Integrated Services in the Internet: A Tutorial," IEEE Communications Magazine, pp. 100-106, May 1997.

Beck, Christopher J., et al., "Scheduling alternative activities," http://www.aaai.org/home.html, 1999.

Flykt, P., et al., "SIP Services and Interworking IPv6," 3G Mobile Communication Technologies, Mar. 26-28, 2001, Conference Publication No. 477.

Schulzrinne, Henning, et al., "Signaling for internet telephony," Columbia University, Dept. of Computer Science Technical Report CUCS-005-98, Feb. 2, 1998.

Barzilai, Tsipora, et al., "Design and Implementation of an RSVP-based Quality of Service Architecture for Integrated Services Internet," IEEE, May 1997.

Hubaux, Jean-Pierre, et al., "The impact of the Internet on telecommunication architectures," Computer Networks 31 (1999).

Roberts, Erica, "The New Class System,"http://www.data.com/roundups/class_system.html, pp. 1-14, Sep. 22, 1999.

Wroclawski, J., "The Use of RSVP with IETF Integrated Services," ftp://ftp.isi.edu/in-notes/rfc2210.txt, Sep. 22, 1999.

Sloman, Morris, et al., "Distributed Management for the Networked Millennium," Proceedings of the Sixth IFIP/IEEE International Symposium on Integrated Network Management—Boston, MA, U.S.A., May 24-28, 1999.

Schulzrinne, Henning, "MIME-Version: 1.0," email communication dated Oct. 10, 1995.

Garrahan, James J., et al., "Marching toward the global intelligent network," IEEE Communications Magazine, vol. 31, No. 3, pp. 30-36, Mar. 1993.

Gys, L, et al., "Intelligence in the Network," Alcatel Telecommunications Review, pp. 13-22, 1st Quarter 1998.

Yang, C., "INETPhone Telephone Services and Servers on Internet," Network Working Group, pp. 1-6, Apr. 1995.

Perret, Stephane, et al., "MAP: Mobile Assistant Programming for Large Scale Communication Networks," IEEE, pp. 1128-1132, Apr. 1996.

Plunkett, Bill, "ISCP Service Capacity Improvements," Bellcore, Feb. 29, 1996.

Murray, Dave, "High speed signalling link interface for ISCP version 6.0," Bellcore, Feb. 29, 1996.

Evans, Jeff, "Alternative Approaches for Multi-ISCP Locator," Bell Atlantic, Mar. 13, 1996.

Performance Task Force, "Off-Line Engineering Tool," Bellcore, Sep. 3, 1996.

Jones, Doug R., "Advanced intelligent network delivering control of network routing," Bell Atlantic, downloaded, Aug. 20, 2008.

Gorton, Dave, "ISCP Evolution overview," Telcordia Technologies Inc., Jun. 5, 2001.

Brown, Kathryn C., "Telecom Convergence," PowerPoint presentation, downloaded Aug. 21, 2008.

Cohen, Danny, "Specifications for the Network Voice Protocol (NVP)," http://www.rfc-archive.org/getrfc.php?rfc=741, Nov. 22, 1977.

Low, Colin, "The Internet Telephony Red Herring," Hewlett Packard, pp. 1-15, May 15, 1996.

de la Fuente, L.A., et al., "Application of the TINA-C Management Architecture," Bellcore, Red Bank, NJ, downloaded, Aug. 21, 2008.

Finseth, C. "An access control protocol, sometimes called TACACS," Network Working Group, University of Minnesota, pp. 1-21, Jul. 1993.

Buchanan, Ken, et al., "IMT-2000: Service Provider's Perspective," IEEE Personal Communications, pp. 8-13, Aug. 1997.

Pontailler, Catherine, "TMN and New Network Architectures," IEEE Communications Magazine, pp. 84-88, Apr. 1993.

Mills, Mike, "Phone service via the internet may slash rates," The Washington Post, A Section; p. A01, Sunday, Final Edition, Aug. 11, 1996.

Chapman, Martin, et al, "Overall Concepts and Principles of TINA," TINA-C, Version 1.0, Feb. 17, 1995.

Kahane, Opher, et al, "Call Management Agent System Specification," Voice over IP Forum Technical Committee in Chicago, Aug. 14, 1996.

Verjinski, Richard D., "PHASE, A Portable Host Access System Environment," IEEE, May 1989.

*Verizon Services Corp., et al., v. Cox Fibernet Virginia, Inc., et al.*, Report of Herman J. Helgert, Ph.D., Exhibit D, downloaded, Aug. 21, 2008.

*Verizon Services Corp., et al., v. Cox Fibernet Virginia, Inc., et al.*, Report of Herman J. Helgert, Ph.D., Exhibit E, downloaded, Aug. 21, 2008.

*Verizon Services Corp., et al., v. Cox Fibernet Virginia, Inc., et al.*, Report of Herman J. Helgert, Ph.D., Exhibit F, downloaded, Aug. 21, 2008.

The Jeff Pulver Blog: Free World Dialup and Verizon's patent on "name translation," http://pulverblog.pulver.com/archives/006846.html, pp. 1-19, Apr. 23, 2007.

Lipoff, Stuart, "Operations Support System Framework for Data Over Cable Services," Data Over Cable Technical Reports, MCNS Holdings, L.P., Oct. 16, 1996.

Sinnreich, H., et al., "Interdomain IP communications with QoS, authorization and usage reporting," http:www.cs.columbia.edu/-hgs/sip/drafts/draft-sinnreich-sip-qos-osp, Feb. 2000.

Pan, Ping, et al., "Diameter: Policy and Accounting Extension for SIP," Internet Engineering Task Force, Internet Draft, pp. 1-17, Nov. 15, 1998.

McConnell, Brian, "How to build an internet PBX," Pacific Telephony Design, http://www.phonezone.com/ip-phone.htm, pp. 1-9, Oct. 28, 1996.
Sears, Andrew, "Innovations in Internet Telephony: The Internet as the Competitor to the POTS Network," Innovation in Internet Telephony: The Internet as the Successor to the POTS Network, pp. 1-6, Feb. 28, 1996.
"Supercharging the web with computer telephony," CT and the 'Net, Mar. 1996.
Anand, Surinder S., et al., "Accounting architecture for cellular networks," ICPWC '96, IEEE, pp. 184-189, 1996.
Karttunen, Jari, et al., "Cost structure analysis and reference model for SCALEABLE network services," The Institution of Electrical Engineers, pp. 1-9, 1996.
Jennings, Barbara J., "End-User Requirements for High-Integrity Directory," Sandia National Laboratories, Albuquerque, IEEE, pp. 1793-1796, 1996.
Botvich, D., et al., "On Charging for Internet Services provided over an A.TIVI network," IEEE, pp. 669-679, 1997.
Estrin, Deborah, et al., "Design Considerations for Usage Accounting and Feedback In Internetworks," downloaded, Aug. 19, 2008.
Li, Chung-Sheng, et al., ""Time-driven Priority" Flow Control for Real-time Heterogeneous Internetworking," IBM T. J. Watson .and. esearch Center, IEEE, pp. 189-197, 1996.
Edell, RJ., et al., "Billing users and pricing for TCP," IEEE Journal on Selected Areas in Communications, vol. 13, Issue 7, pp. 1162-1175, Sep. 1995.
Margulies, Ed, "CT's Cyberdate With the 'Net," Computer Telephony Periscope, pp. 28-29, Aug. 1996.
Inamori, Hisayoshi, et al., "Common Software Platform for Realizing a Strategy for Introducing the TMN," Network Operations and Management Symposium, vol. 2, pp. 579-589, Feb. 1998.
Rajan, R., et al., "A policy framework for integrated and differentiated services inthe Internet," Network, IEEE, vol. 13, Issue 5, pp. 36-41, Sep./Oct. 1999.
Louth, Nick, "MCI Communications Corp. vaults phone-data divide," Reuters Limited, News article, Jan. 29, 1998.
Eriksson, Hans, "MBONE: The Multicast Backbone," fileIIICI/Documents%20and%20Settings/ralbertJDesktopIMBONE%2OThe%20Multicast%20Backbone.htm (1 of 13)Mar. 7, 2008 4:06:17 PM.
Macedonia, Michael R., et al., "MBone Provides Audio and Video Across the Internet," file:///CI/Documents%20and%20Settings/ralbert/Deskt... 20Audio%20and%20Video%20Across%20the%20Intern.htm (1 of 13) Mar. 10, 2008 9: 34:00 AM.
Lapolla, Stephanie, "Net call centers, voice to merge," News, PC Week, Mar. 31, 1997.
Bohn, Roger, et al., "Mitigating the coming Internet crunch: multiple service levels via precedence," San Diego Supercomputer Center, Mar. 22, 1994.
Weiss, W., "QoS with differentiated services," Bell Labs Technical Journal vol. 3, No. 4, pp. 48-62, Oct.-Dec. 1998.
Hartanto, Felix, et al., "Policy-Based Billing Architecture for Internet Differentiated Services," Proceedings of IFIP Fifth International Conference on Broadband Communications (BC '99), Hong Kong, Nov. 10-12, 1999.
Mahadevan, I., et al., "Parallel Architectures, Algorithms, and Networks," (I-SPAN '99) Proceedings. Fourth InternationalSymposium, pp. 420-425, Jun. 23-25, 1999.
Schulzrinne, H., et al., "A Transport Protocol for Real-Time Applications," Network Working Group, Audio-Video Transport Working Group, pp. 1-151, Mar. 10, 2008.
Schulzrinne, H., "RTP Profile for Audio and Video Conferences with Minimal Control," Network Working Group, Audio-Video Transport Working Group, pp. 1-18, Jan. 1996.
Kim, Gary, "Talk is cheap voice over the internet," America's Network, pp. 34-39, Jul. 15, 1996.
Newton, Harry, "Notes from the field: The personal side of CT," 12 Computer Telephony, Jan. 1997.
Venditto, Gus, "Internet phones the future is calling," Internet World Magazine, Jun. 1996.
Crowcroft, Jon, et al., "Pricing internet services," Department of Computer Science, UCL, Gower Street, London, UK, pp. 1-16, downloaded, Aug. 19, 2008.
Newton, Harry, "Telephony Messaging on the Internet," http://www.dialogweb.com/cgi/dwclient?req=1205770063076 (1 of 5) Mar. 17, 2008 12:08:09 PM.
Maruyama, Katsumi, et al., "A Concurrent Object-Oriented Switching Program in Chill," 2460 IEEE Communications Magazine, Jan. 29, 1991, No. 1, pp. 60-68, New York.
Rajkumar, R., et al., "A resource allocation model for QoS management," Proceedings. The 18th IEEE Real-Time Systems Symposium (Cat.No. 97CB36172) p. 298-307, Dec. 2-5, 1997.
Weinrib, A., et al., "Decentralized resource allocation for distributed systems," IEEE INFOCOM '87. The Conference on Computer Communications. Proceedings. Sixth Annual Conference—Global Networks: Concept to Realization (Cat. No. 87CH2412-5) p. 328-36, M.
Shabana, Mohamed, et al., "Intelligent switch architecture," 8081 Proceedings of the National Communications Forum 42 Sep. 30, 1988, No. 2, Chicago, IL., pp. 1312-1319.
Nagarajan, Ramesh, et al., "Local Allocation of End-to-End Quality-of-Service in High-Speed Networks," National Research Foundation under grant NCR-9116183 and the Defense Advanced Projects Research Agency under contract NAG2-578, pp. 1-28, downloaded, A.
Elixmann, Martin, et al., "Open Switching—Extending Control Architectures to Facilitate Applications," ISS Symposium, pp. 239-243, Apr. 23, 1995.
Chandra, P., et al., "Network support for application-oriented QoS," (IWQoS 98) 1998 Sixth International Workshop on Quality of Service, pp. 187-195, May 18-20, 1998.
Klein, Rachelle S., et al., "Minimax Resource Allocation With Tree Structured Substitutable Resources,"Operations Research, vol. 39, No. 2, pp. 285-295, Mar.-Apr. 1991.
Nyong, D., et al., "Resource based policies for design of interworking heterogeneous service networks," Interoperable Communications Networks, vol. 1, Nos. 2-4, pp. 571-580, 1998.
Kabay, S., et al., "The service node—an advanced IN services element," 8438 BT Technology Journal vol. 13 Apr. 1995, No. 2, pp. 64-72.
Mayer, Robert L, et al., "Service Net-2000: An intelligent network evolution," 8010 At.and.T Technical Journal 70 (1991) Summer, No. 3/4, pp. 99-110, Short Hills, NJ.
Gupta, Amit, "Resource sharing for multi-party real-time communication," Proceedings of the Fourteenth Annual Joint Conference of the IEEE Computer and Communication Societies (INFOCOM '95), pp. 1230-1237, 1995.
Kausar, Nadia, et al., "A Charging Model for Sessions on the Internet," IEEE, pp. 32-38, Apr. 1999.
Schutzrinne, Henning, "A comprehensive multimedia control architecture for the Internet," IEEE, pp. 65-76, Sep. 1997.
Tsaoussidis, V., et al., "A CORBA-based Application Service Middleware Architecture and Implementation," State University, of NY at Stony Brook, pp. 1-7, downloaded, Aug. 19, 2008.
Bernet, Y., et al., "A Framework for Differentiated Services," The Internet Society, pp. 1-35, Sep. 22, 1999.
Gleeson, B., et al., "A Framework for IP Based Virtual Private Networks," The Internet Society, pp. 1-62, Feb. 2000.
Yavatkar, Raj, et al., "A Framework for Policy-based Admission Control," Internet Engineering Task Force, pp. 1-19, Apr. 1999.
Ekstein, Ronnie, et al., "AAA Protocols: Comparison between RADIUS, DIAMETER and COPS," Internet Engineering Task Force (IETF), pp, 1-17, Aug. 1999.
Hussmann, H., et al., "An edge device for supporting internet integrated services over switched ATM networks," pp. 1-10, downloaded, Aug. 19, 2008.
Sinnreich, H., et al., "Interdomain IP communications with QoS, authorization and usage reporting," http:www.ietf.org/internet-drafts..., Jan. 2000.
Mascolo, Cecilia, et al., "An XML based Programmable Network Platform," Dept. of Computer Science, University College London, pp. 1-5, Jun. 10, 2005.
Oran, Dave, "Dial plan mapping for voice-over-IP," Access Engineering, Apr. 11, 1996.

Getting started guide for Internet Phone release 4, http://www.vocaltec.com, 1993-1996 VocalTec Inc.

VocalTec desktop dialer version 3.0, User reference, http://www.vocaltec.com, 1997 VocalTec Ltd.

"Vocaltec's telephony gateway software captures 1996 product of the year honors from computer telephony magazine," Herzliya, Israel, Dec. 18, 1996, VocalTec, Ltd.

"Introduction to VTG," Northvale, NJ 07647, Tel. 201-768-9400, info@vocaltec.com, www.vocaltec.com, posted not earlier than Dec. 24, 1996.

Kahane, Opher, et al., "IMTC VoIP Forum Contribution." Subject: Call management agent system requirements function architecture and protocol, VoIP97-010, pp. 1-44, Seattle, Jan. 1, 1997.

Kahane, Opher, "Introduction to VocalTec's CMA system," Intelligent switching for a new era of telecom, Nov. 7, 1996.

Newton, Harry, "Newton's Telecom Dictionary," 22nd edition, pp. 728, 2006.

Braden, R., et al., "Resource ReSerVation Protocol (RSVP)—Version 1 Functional Specification," Network Working Group, pp. 1-224, Univ. of Michigan, Sep. 1997.

Keiser, Bernhard E., et al., "Digital Telephony and Network Integration," downloaded Jul. 1, 2008.

Boyle, Jim, et al., "The COPS (Common Open Policy Service) Protocol," http://www.ietf.orgiintemet-drafts/draft-ietf-rap-cops-07.txt, pp. 1-35, Aug. 16, 1999.

Bellamy, John, "Digital telephony," Dallas, TX, Oct. 1981.

Open and standardized—the world of IP Protocols, "H.323: The Leading Standard in Voice over IP," downloaded Jul. 1, 2008.

"Inside APPN—The Essential Guide to the Next-Generation SNA," IBM, International Technical Support Organization Raleigh Center, Raleigh, NC, Jun. 1997.

Friedes, A., et al. "Integrating the world through communications," IEEE ICC, vol. 1 of 3, Jun. 22-25, 1986.

Huitema, Christian, "Routing in the internet," Prentice Hall, Englewood Cliffs, NJ, 1995.

Lucky, R.W., "Applications of communications theory," Fundamentals of digital switching, AT+T Laboratories, Second Edition, downloaded, Jul. 3, 2008.

Bellamy, John, "Digital telephony," Second Edition, Wiley Series in Telecommunications, downloaded, Jul. 3, 2008.

Stallings, William, "ISDN and Broadband ISDN with frame relay and ATM," Prentice Hall, Upper Saddle River, NJ, downloaded, Jul. 3, 2008.

GR-1298-CORE, AINGR: Switching Systems, Telcordia Technologies, Issue 10, Nov. 2004.

GR-2863-CORE, CCS Network Interface Specification (CCSNIS) Supporting Advanced Intelligent Network (AIN), Bellcore, Bell Communications Research, Issue 2, Dec. 1995.

GR-246-CORE, Telcordia technologies specification of signalling system No. 7, Telcordia Technologies, Issue 10, Dec. 2005.

GR-1280-CORE, Advanced intelligent network (AIN) service control point (SCP) generic requirements, Telcordia Technologies, Issue 1, Aug. 1993.

Morris, Christopher, Academic Press Dictionary of Science and Technology, Academic Press, downloaded, Jul. 3, 2008.

GR-1428-CORE, CCS Network Interface Specification (CCSNIS) Supporting Toll-Free Service, Bellcore, Issue 2, May 1995.

Mockapetris, P., "Domain names—concepts and facilities," Network working group, Nov. 1987.

Mockapetris, P., "Domain names—implementation and specification," Network Working Group, Nov. 1987.

Finseth, C. "An access control protocol, sometimes called TACACS," Network Working Group, University of Minnesota, pp. 1-20, Jul. 1993.

Carrel, D., "The TACACS+ Protocol," Network Working Group, Cisco, Oct. 1996.

ITU-T, "Line transmission of non-telephone signals," Recommendation H.323, May 28, 1996.

Product releases webpage, VocalTec, info@vocaltec.com, Aug. 26, 1996.

Tutorial on "H.323," by The International Engineering Consortium, http://www.iec.org, pp. 1-30, downloaded, Jul. 3, 2008.

Everhart, C., et al., "New DNS RR Definitions," Network Working Group, University of Maryland, pp. 1-11, Oct. 1990.

Handley, M., et al., "SIP: Session Initiation Protocol," Network Working Group, The Internet Society, Mar. 1999.

Rosenberg, J., et al., "SIP: Session Initiation Protocol," Network Working Group, The Internet Society, Jun. 2002.

Brannen, Lynn, et al., "Next generation switch," MCI Telecommunications, May 16, 1997.

Shen, Yi-Shang, "Communications network with flexible call routing and resource allocation," MCI Invention Disclosure Form, Jan. 8, 1998.

Kahane, Opher, et al, "Call management agent system specification," VoIP Forum Technical Committee Contribution, Chicago, IL, Aug. 14, 1996.

Pulver, Jeff, "The internet telephone tookit," Wiley Computer Publishing, New York, NY, 1996.

Haley, James E., "Pay-per-call blocking using LIDB," AIN Service Description, Bell Atlantic Easy Number Call Routing Service, Oct. 1996.

American National Standard for Telecommunications—Signalling System No. 7 (SS7)—Signalling Connection Control Part (SCCP), American National Standards Instiue, Inc., ANSITI.112-1992, Oct. 26, 1992.

American National Standard for Telecommunications—Signalling System No. 7 (SS7)—Message Transfer Part (MTP), American National Standards Instiue, Inc., Mar. 14, 1996.

American National Standard for Telecommunications—Signalling System No. 7 (SS7)—Signalling Connection Control Part (SCCP), American National Standards Instiue, Inc., ANSITI.110-1992, Jun. 2, 1992.

Gasman, Lawrence, "Broadband networking," Van Nostrand Reinhold, Jun. 13, 1994.

Balkovich, Ed, et al., "Project clarity: First internal trial," Readiness Review, Bell Atlantic Confidential and proprietary, Jul. 21, 1997.

Grigonis, Richard "Zippy," "Computer telephony over the Internet," CT and the 'Net, Mar. 1996.

Park, Myung Ah, et al., "Dial-up internet access service system with automatic billing mechanism," ICICS 1997, Electronics .and. Telecommunications Research Institute, pp. 148-151, Singapore, Sep. 9-12, 1997.

Ei-Gendy, Hazem, et al., "Computer-supported routing for intelligent networks and personalized wired communications," ICCS 1994, pp. 1027-1033, Aug. 1994.

"Audio and video over the Internet," CT and the 'Net, Mar. 1996.

Malamud, Carl, et al., "Internet talk radio: Geek of the week," Mobile IP Networking, O'Reilly .and. Associates, Inc., transcript of interview, Nov. 1993.

U.S. Appl. No. 60/023,891, filed Aug. 16, 1996.

Mills, M. (Mar. 8, 1996) "Freebie Heebie-Jeebies: New Long-Distance Calling Via the Internet Scares Small Phone Firms", The Washington Post, sec. F, pp. 1-2.

Hughes, D.T. (Feb. 21, 1995) "What Hath (Net) God Wrought?", The Journal [Fairfax, Virginia], sec. B, pp. 1-2.

Hughes, D.T. (May 28, 1996) "WebPhone Heading for Serious Telephony", The Journal, [Fairfax, Virginia], sec. A, p. 8.

Mills, M. (Jan. 23, 1996) "It's the Net's Best Thing to Being There: With Right Software, Computer Becomes Toll-Free Telephone", The Washington Post, sec. C, pp. 1, 5.

Hughes, D.T. (Jan. 2, 1996) "Internet Phone Wars Heating Up: Companies Improve and Encourage Users to Test Products", The Journal, [Fairfax, Virginia], sec. A, p. 6.

Yang, C. (Feb. 12, 1995), "INETPhone: Telephone Services and Serves on Internet", RFC 1789 http://ds.internic.net/rfc/rfc/rfc1789.txt.

Kuehn, Richard A. (Jul. 1994) "The Voice of Technology", [Online text only] Credit World, vol. 82, No. 6, pp. 20-23.

Margulies, Edwin (Aug. 1996) Understanding the Voice-Enabled Internet, Flatiron Publishing, Inc., pp. 4-42 and 12-1 to 12-3.

C. Low, "The Internet Telephony Red Herring," Hewlett-Packard Laboratories, (May 15, 1996), pp. 1-15.

C. Low et al., WebIN-an architecture for fast deployment of IN-based personal services, Intelligent Network Workshop, 1996, IN '96, IEEE, (Apr. 21-24, 1996), vol. 2, 196+258.

Cady et al., "Mastering the Internet", Sybex Inc., Alameda, CA 1994, ISBN 94-69309.

Stevens, "TCPIP Illustrated", vol. 1, 1994, Addison-Wesley, pp. 12-122 and inside cover.

Keiser et al., "Digital Telephony and Network Integration", 1995, Chapman Hall, Second Edition, pp. 426-428.

Chopra, Manvinder, Exploring Intelligent Peripheral Configuration, Universal Personal Communications, 1994. Record., 1994 Third Annual International Conference on, Sep. 27-Oct. 1, 1994, pp. 635-639.

Weisser et al. "The Intelligence Network and Forward-Looking Technology" IEEE COMM magazine, Dec. 1988, pp. 64-69.

Shah et al. "Application of a New Network Concept for Faster Service Deployment" International Conference on COMM. 88 Jun. 12-15, 1988, IEEE Comm. Soc. Conference. Record, vol. 3, pp. 1327-1329.

Audio Messaging Interchange Specification (AMIS)—Analog Protocol, Version 1, Issue 2, Feb. 1992.

Jabbari, B., "Common Channel Signaling System No. 7 for ISDN and Intelligent Networks", Proceedings of the IEEE, vol. 79, No. 2, Feb. 1991, pp. 155-169.

Supercharging the Web with Computer Telephony, CT and the 'Net, Mar. 1996.

Audio and Video Over the Internet, CT and the 'Net, Computer Telephony, Mar. 1996.

Grigonis, Richard, "Computer Telephony Over the Internet", CT and the Net, Mar. 1996.

Geek of the Week: Carl Malamud Interviews Phil Karn .and. Jun Murai, Internet Talk Radio, Mobile IP Networking, Nov. 1993.

McConnell, Brian, "How to Build an Internet PBX", Pacific Telephony Design, printed from http://www.phonezone.com/ip-phone.htm Mar. 5, 1997.

Welcome to the Phone Zone, Pacific Telephony Design, http://www.phonezone.com/index2.htm, pp. 1-6, Oct. 28, 1996.

Sears, Andrew, "Innovations in Internet Telephony: The Internet as The Competitor to The Pots Network", Innovations in Internet Telephony: The Internet as the Successor to the Pots Network, Feb. 28, 1996, pp. 1-6.

Computer Telephony And The Internet, Stylus Innovation, http://www.stylus.com/hvml.htm, 1997.

Hedrick, C., "Routing Information Protocol", Jun. 1988, http://www.internic.net/rfc/rfc1058.txt, pp. 1-30.

Mills, D.L., "An Experimental Multiple-Path Routing Algorithm", Mar. 1986, http://www.internic.net/rfc/rfc981.txt, pp. 1-20.

Lougheed et al., "A Border Gateway Protocol (BGP)", Jun. 1990, http://www.internic.nethic/rfc1163.txt, pp. 1-26.

S. Deering, "Host Extensions for IP Multicasting", Aug. 1989, http://www.internic.netlitc/rfc1112.txt, pp. 1-16.

Waitzman et al., "Distance Vector Multicast Routing Protocol", Nov. 1988, http://www.internic.net/rfc/rfc1075.txt, pp. 1-22.

Hinden et al., "The DARPA Internet Gateway", Sep. 1982, http://www.internic.net/rfc/rfc823.txt, pp. 1-41.

VocalTec's Telephony Gateway—The Ultimate Internet Telephony Solution?, Computer Telephony Magazine, Sep. 1996.

A Call to Phones, Wired Magazine, Issue 4.03, http://www.wired.com/wired/archive/4.03/updata.html (Mar. 1996).

Mascoli, Cicchetti .and. Listanti, "Alternative Scenarios for Data Applications Via Internet-Mobile and DECT-ATM Interworkin," 4th IEEE International Conference on Universal Personal Communications, pp. 788-792, Nov. 6-10, 1995 published Apr. 1995.

Blackwell et al. "Secure Short-Cut Routing for Mobile IP," USENIX Summary 1994 Technical Conferences, Jun. 6-10, 1994.

Okada et al. "Mobile Communication Using PHS [Personal Handy Phone System] Communications Server," National Technical Report, vol. 42, No. 1, pp. 46-54 (Feb. 1996).

Sattler, Michael, "Nautilus Voice Encryption," May 10, 1995.

Chernov, Andrey A. "SpeakFreely" software, Apr. 18, 1996.

Netspeak Corporation Introduces Webphone, Industry's First Internet-Based Telephony Solution for Business Users, PC Forum, Mar. 18, 1996.

Free World Dialup Beta 2.0a Client, Feb. 12, 1996.

Kahane et al., "VocalTec IP Forum Contribution", VocalTec Inc., Seattle, WA, Jan. 15, 1997.

Handley et al., "SIP: Session Initiation Protocol", Internet Engineering Task Force, Internet Draft, Jul. 31, 1997, draft-ietf-mmusic-sip-03.txt, Jul. 31, 1997.

Internet Telephony for Dummies 2nd Edition, Chapters 14-16, 1997.

Kahane et al., "Call Management Agent System Specification" VoIP Forum Technical Committee, Aug. 14, 1996.

IMTC Voice over IP Forum Service Interoperability Implementation Agreement, Draft 0.91, Document VoIP-008, Jan. 13, 1997.

Sebestyn, I., ITU Telecommunication Standardization Sector, Study Group 15, Q;2 .and. 3/15 Rapporteur Meeting, Document AVC-1086, v1, Dec. 5, 1996.

Oppen et al., "The Clearinghouse: A Decentralized Agent for Locating Named Objects in a Distributed Environment", ACM Transactions on Office Information Systems, vol. 1, No. 3, Jul. 1983, pp. 230-253.

Anthony R. Noerpel et al., "PACS: Personal Access Communications System—A Tutorial," IEEE Personal Communications, Jun. 1996.

USDC For the Eastern Distric of Virginia, Alexandria Division, "Claim Construction of the Patents-In-Suit" Civil Action No. 08-0157, dated Sep. 3, 2008.

\* cited by examiner

FIG. 5

TELEPHONY COMMUNICATION VIA VARIED REDUNDANT NETWORKS

RELATED APPLICATIONS

This is a continuation of prior co-pending U.S. patent application Ser. No. 11/354,033, filed Feb. 2, 2006, which is a continuation of U.S. patent application Ser. No. 09/617,816, filed Jul. 17, 2000, which is a continuation of U.S. patent application Ser. No. 08/931,985, filed Sep. 17, 1997, which is a continuation-in-part of U.S. patent application Ser. No. 08/634,543, filed Apr. 18, 1996 (now U.S. Pat. No. 6,438,218, "Internet Telephone Service"), Ser. No. 08/698,713, filed Aug. 16, 1996 (now U.S. Pat. No. 6,125,113, "Internet Telephone Service"), and Ser. No. 08/790,888, filed Feb. 3, 1997, (now U.S. Pat. No. 6,122,225, "Internet Telephone Service with Mediation").

This application is also related to application Ser. No. 08/598,767, "Analog Terminal Internet Access," filed Feb. 2, 1996, which is a continuation-in-part of application Ser. No. 08/353,281, filed Dec. 5, 1994; Ser. No. 08/371,906, filed Jan. 12, 1995; Ser. No. 08/539,952, filed Oct. 6, 1995; Ser. No. 08/557,749, filed Dec. 13, 1995; Ser. No. 08/634,544, filed Apr. 18, 1996, Ser. No. 08/790,888 filed Feb. 3, 1997, Ser. No. 08/815,363, filed Mar. 11, 1997, Ser. No. 08/816,227, filed Mar. 12, 1997, Ser. No. 08/821,027, filed Mar. 19, 1997, and Ser. No. 08/547,178, filed Oct. 24, 1995, which applications are assigned to the assignee of the instant application. The specifications of those applications are incorporated herein by referenced in their entirety.

TECHNICAL FIELD

The present invention relates to methods and system structures for providing public and private telephone service between two terminals over selectable networks of differing types. More particularly the invention relates to providing such telephone service in a manner to permit optimization of a selectable parameter, such as, minimizing cost, maximizing quality, maximizing availability of connection, and the like.

BACKGROUND

The availability of public and private telephony communication has become so universal in the United States and in other developed countries that it has become critical to the functioning of modern society. At the same time, its very popularity and multipurpose use have led to demands that tax the efficient operation of the varied systems that provide that universality. While multiple types of networks are used for providing telephone service it is not always appreciated to what a large extent those different networks are interrelated. Thus, the very efficacy of one of the interrelated systems in optimizing one parameter may cause the overload or breakdown of an interrelated system, which is necessary to provide end to end service. In order that the nature of these problems may be fully appreciated, it is necessary to have an understanding not only of the factors which determine the inherent parameters of the individual networks, but also the factors which impose limitations on the interlinked networks. To that end there is here presented a brief description of the two networks which are most currently involved. These are the Internet and the public switched telephone network (PSTN).

The Internet is an interconnected global computer network of tens of thousands of packet-switched networks using the Internet protocol (IP). It is a network of networks. For purposes of understanding how the Internet works, three basic types of entities can be identified. These are end users, Internet service providers, and backbone providers. End users access and send information either through individual connections or through organizations such as universities and businesses. End users in this context include both those who use the Internet primarily to receive information, and content creators who use the Internet to distribute information to other end users. Internet service providers (ISPs), such as Netcom, PSI, and America Online, connect those end users to Internet backbone networks. Backbone providers, such as MCI, UUNet, and Sprint, route traffic between ISPs, and interconnect with other backbone providers.

This tripartite division highlights the different functionalities involved in providing Internet connectivity. The actual architecture of the Internet is far more complex. Backbone providers typically also serve as ISPs; for example, MCI offers dial-up and dedicated Internet access to end users, but also connects other ISPs to its nationwide backbone. End users such as large businesses may connect directly to backbone networks, or to access points where backbone networks exchange traffic. ISPs and backbone providers typically have multiple points of interconnection, and the inter-relationships between these providers are changing over time. It is important to appreciate that the Internet has no "center," and that individual transmissions may be routed through multiple different providers based on a number of factors.

End users may access the Internet though several different types of connections, and unlike the voice network, divisions between "local service" providers and "long-distance" providers are not always clear. Most residential and small business users have dial-up connections, which use analog modems to send data over plain old telephone service (POTS) lines of local exchange carriers (LECs) to ISPs. Larger users often have dedicated connections using high-speed ISDN, frame relay or T1 lines, between a local area network at the customer's premises and the Internet. Although the vast majority of Internet access today originates over telephone lines, other types of communications companies, such as cable companies, terrestrial wireless, and satellite providers, are also beginning to enter the Internet access market.

The roots of the current Internet can be traced to ARPANET, a network developed in the late 1960s with funding from the Advanced Research Projects Administration (ARPA) of the United States Department of Defense. ARPANET linked together computers at major universities and defense contractors, allowing researchers at those institutions to exchange data. As ARPANET grew during the 1970s and early 1980s, several similar networks were established, primarily between universities. The TCP/IP protocol was adopted as a standard to allow these networks, comprised of many different types of computers, to interconnect.

In the mid-1980s, the National Science Foundation (NSF) funded the establishment of NSFNET, a TCP/IP network that initially connected six NSF-funded national supercomputing centers at a data rate of 56 kilobits per second (kbps). NSF subsequently awarded a contract to a partnership of Merit (one of the existing research networks), IBM, MCI, and the State of Michigan to upgrade NSFNET to T1 speed (1.544 megabits per second (Mbps)), and to interconnect several additional research networks. The new NSFNET "backbone," completed in 1988, initially connected thirteen regional networks. Individual sites such as universities could connect to one of these regional networks, which then connected to NSFNET, so that the entire network was linked together in a hierarchical structure. Connections to the federally-subsidized NSFNET were generally free for the regional networks, but the regional networks generally charged smaller networks a flat monthly fee for their connections.

The military portion of ARPANET was integrated into the Defense Data Network in the early 1980s, and the civilian ARPANET was taken out of service in 1990, but by that time NSFNET had supplanted ARPANET as a national backbone for an "Internet" of worldwide interconnected networks. In the late 1980s and early 1990s, NSFNET usage grew dramatically, jumping from 85 million packets in January 1988 to 37 billion packets in September 1993. The capacity of the NSFNET backbone was upgraded to handle this additional demand, eventually reaching T3 (45 Mbps) speed.

In 1992, the NSF announced its intention to phase out federal support for the Internet backbone, and encouraged commercial entities to set up private backbones. Alternative backbones had already begun to develop because NSFNET's "acceptable use" policy, rooted in its academic and military background, ostensibly did not allow for the transport of commercial data. In the 1990s, the Internet has expanded decisively beyond universities and scientific sites to include businesses and individual users connecting through commercial ISPs and consumer online services.

Federal support for the NSFNET backbone ended on Apr. 30, 1995. The NSF has, however, continued to provide funding to facilitate the transition of the Internet to a privately-operated network. The NSF supported the development of three priority Network Access Points (NAPs), in Northern California, Chicago, and New York, at which backbone providers could exchange traffic with each other, as well as a "routing arbiter" to facilitate traffic routing at these NAPs. The NSF funded the vBNS (Very High-Speed Backbone Network Service), a non-commercial research-oriented backbone operating at 155 megabits per second. The NSF provides transitional funding to the regional research and educational networks, as these networks are now required to pay commercial backbone providers rather than receiving free interconnection to NSFNET. Finally, the NSF also remains involved in certain Internet management functions, through activities such as its cooperative agreement with SAIC Network Solutions Inc. to manage aspects of Internet domain name registration.

Since the termination of federal funding for the NSFNET backbone, the Internet has continued to evolve. Many of the largest private backbone providers have negotiated bilateral "peering" arrangements to exchange traffic with each other, in addition to multilateral exchange points such as the NAPs. Several new companies have built nationwide backbones. Despite this increase in capacity, usage has increased even faster, leading to concerns about congestion. The research and education community, with the support of the White House and several federal agencies, recently announced the "Internet II" or "next-generation Internet" initiative to establish a new high-speed Internet backbone dedicated to non-commercial uses.

As of January 1997 there were over sixteen million host computers on the Internet, more than ten times the number of hosts in January 1992. Several studies have produced different estimates of the number of people with Internet access, but the numbers are clearly substantial and growing. A recent Intelliquest study pegged the number of subscribers in the United States at 47 million, and Nielsen Media Research concluded that 50.6 million adults in the United States and Canada accessed the Internet at least once during December 1996—compared to 18.7 million in spring 1996. Although the United States is still home to the largest proportion of Internet users and traffic, more than 175 countries are now connected to the Internet.

According to a study by Hambrecht & Quist, the Internet market exceeded one billion dollars in 1995, and is expected to grow to some 23 billion dollars in the year 2000. This market is comprised of several segments, including network services (such as ISPs); hardware (such as routers, modems, and computers); software (such as server software and other applications); enabling services (such as directory and tracking services); expertise (such as system integrators and business consultants); and content providers (including online entertainment, information, and shopping).

The value of networks to each user increases as additional users are connected. For example, electronic mail is a much more useful service when it can reach fifty million people worldwide than when it can only be used to send messages to a few hundred people on a single company's network. The same logic applies to the voice telephone network.

However, this increasing value also can lead to congestion. Network congestion is an example of the "tragedy of the commons:" each user may find it beneficial to increase his or her usage, but the sum total of all usage may overwhelm the capacity of the network. With the number of users and host computers connected to the Internet roughly doubling each year, and traffic on the Internet increasing at an even greater rate, the potential for congestion is increasing rapidly. The growth of the Internet, and evidence of performance degradation, has led some observers to predict that the network will soon collapse, although thus far the Internet has defied all predictions of its impending doom.

Two types of Internet-related congestion may occur; congestion of the Internet backbones, and congestion of the public switched telephone network when used to access the Internet. These categories are often conflated, and from an end user standpoint the point of congestion matters less than the delays created by the congestion.

Congestion of the Internet backbones results largely from the shared, decentralized nature of the Internet. Because the Internet interconnects thousands of different networks, each of which only controls the traffic passing over its own portion of the network, there is no centralized mechanism to ensure that usage at one point on the network does not create congestion at another point. Because the Internet is a packet-switched network, additional usage, up to a certain point, only adds additional delay for packets to reach their destination, rather than preventing a transmission circuit from being opened. This delay may not cause difficulties for some services such as E-mail, but could be fatal for real-time services such as video conferencing and Internet telephony. At a certain point, moreover, routers may be overwhelmed by congestion, causing localized temporary disruptions known as "brownouts."

Backbone providers have responded to this congestion by increasing capacity. Most of the largest backbones now operate at 155 Mbps (OC-3) speeds, and MCI has upgraded its backbone to OC-12 (622 Mbps) speed. Backbone providers are also developing pricing structures, technical solutions, and business arrangements to provide more robust and reliable service for applications that require it, and for users willing to pay higher fees.

Internet backbone congestion raises many serious technical, economic, and coordination issues. Higher-bandwidth access to the Internet will be meaningless if backbone networks cannot provide sufficient end-to-end transmission speeds. Moreover, the expansion of bandwidth available to end users will only increase the congestion pressure on the rest of the Internet. This has significant implications to local exchange carriers. Most residential subscribers reach their ISPs through dial-up connections to LEC networks. A modem at the customer premises is connected to a local loop, which is connected to a switch at a LEC central office. ISPs also purchase connections to the LEC network. In most cases, ISPs either buy analog lines under business user tariffs (referred to as "1MBs") or 23-channel primary rate ISDN (PRI) service. When a call comes into an ISP, it is received through a modem bank or a remote access server, and the data is sent out through routers over the packet-switched Internet. Both subscribers and ISPs share usage of LEC switches with other customers.

It is becoming increasingly apparent that the current flat charge pricing structure for Internet access contributes to the congestion of LEC networks. Switch congestion can arise at three points in LEC networks—the switch at which the ISP connects to the LEC (the terminating switch), the interoffice switching and transport network, and the originating end user switch. The point of greatest congestion is the switch serving the ISP, because many different users call into the ISP simultaneously.

LECs have engineered and sized their networks based on assumptions about voice traffic. In particular, several decades of data collection and research by AT&T, Bellcore, and others has shown that an average voice call lasts 3-5 minutes, and that the distribution between long and short calls follows a well-established curve. Because very few people stay on the line for very long periods of time, there is no need for LEC switches to support all users of the switch being connected simultaneously. Instead, LEC switches are generally divided into "line units" or "line concentrators" with concentration ratios of typically between 4:1 and 8:1. In other words, there are between four and eight users for every call path going through the switch. Call blockage on the voice network tends to be negligible because a significant percentage of users are unlikely to be connected simultaneously.

The distribution of Internet calls differs significantly from voice calls. In particular, Internet users tend to stay on the line substantially longer than voice users.

Because LEC networks have not been designed for these longer usage patterns, heavy Internet usage can result in switches being unable to handle the load ("switch congestion"). Internet connections tie up a end-to-end call path through the PSTN for the duration of the call. When the average hold time of calls through a switch increases significantly, the likelihood of all available call paths through the switch being in simultaneous use also goes up. If a particular line unit has an 8:1 concentration ratio, only one eighth of the subscriber lines into that line unit need to be connected at one time in order to block all further calls.

Because of the relatively short average duration of voice calls, the primary limiting factor on the capacity of current digital switched for voice calls is the computer processing power required to set up additional calls. Computer processing power can be expanded relatively easily and cheaply, because modern switch central processing units are designed as modular systems that can be upgraded with additional memory and processing capacity. However, Internet usage puts pressure not on the call setup capacity of the switch, but on the number of transmission paths that are concurrently open through the switch.

As may be appreciated from the foregoing the traffic problems that exist with respect to providing reliable telephony communications, particularly long distance communications, involves intertwined limitations that exist separately and in combination in the Internet and in the public switched telephone network.

DISCLOSURE OF THE INVENTION

Summary of Invention

According to the invention there is provided a switched telephone network arranged in a manner to enable packet voice communication between telephone terminals via multiple redundant packet switched networks. The packet switched networks may utilize different protocols, be operated by different entities, and have primary functions other than voice communication. In one preferred embodiment of the invention packet voice communication may be provided over internetworked networks, such as the Internet, and alternately over a packet switched network whose primary function is control of a circuit switched telephone network. The common channel interoffice switching system (CCIS) of a public switched telephone network (PSTN) is a preferred example.

A voice communication link may be established from telephone terminal to telephone terminal via the Internet, the quality of voice communication may be monitored, and the link may be transferred to the common channel interoffice signaling network if and when the quality of voice communication deteriorates beneath a pre-established norm. The invention provides a means for monitoring the links of the common channel interoffice signaling system carrying the packetized voice communication and collecting the information needed to permit charging for the voice communication by time duration or by cells used to carry the packetized voice signal. The customer may be provided with the option of establishing the norm for diversion of the communication, or may elect which path is to be selected as the primary path.

Objects of the Invention

It is a primary object of the present invention to provide a solution to the foregoing problems.

It is another object of the invention to provide enhanced reliable telephony service through varied redundant networks operating in combination.

It is yet another object of the invention to provide such service through mediated selection of an optimal path through such networks, wherein the mediation may be controlled by selectable parameters.

It is a further object of the invention to provide such service wherein the path is customer selectable.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIG. 5 shows in diagrammatic form a communication system which may be used for redundant network telephone communication according to one preferred embodiment of the present invention.

BEST MODE FOR CARRYING OUT THE INVENTION

Applicant's above identified copending parent application Ser. No. 08/634,543, filed Apr. 18, 1996, Public Internet Protocol Transport Network, describes a dual PSTN and Internet communication system which provides a network and methodology for facilitating telephone use of the Internet by customers on an impromptu basis. Provision is made to permit a caller to set-up and carry out a telephone call over the Internet from telephone station to telephone station without access to computer equipment and without the necessity of maintaining a subscription to any Internet service. Usage is made of CCIS (common channel interoffice signaling) signaling to set up the call and establish the necessary Internet connections and addressing. Calls may be made from telephone station to telephone station, from voice capable computer to voice capable computer, or from telephone to computer or computer to telephone.

Applicant's above-identified copending parent application Ser. No. 08/698,713, filed Aug. 16, 1996, Internet Telephone Service, describes an improved version of that system of networks which enables wireless telephone access to Internet telephony.

Applicant's above identified copending parent application Ser. No. 08/790,888, Internet Telephone Service with Mediation, describes yet another improvement providing dual path customer access to the ISP with traffic mediation to alleviate overload of the local PSTN between the customer and ISP (Internet Service Provider) circuits.

While each of these systems provides significant improvement of previously available Internet telephony service, they do not address the totality of overload conditions described in detail above.

Figure 1:
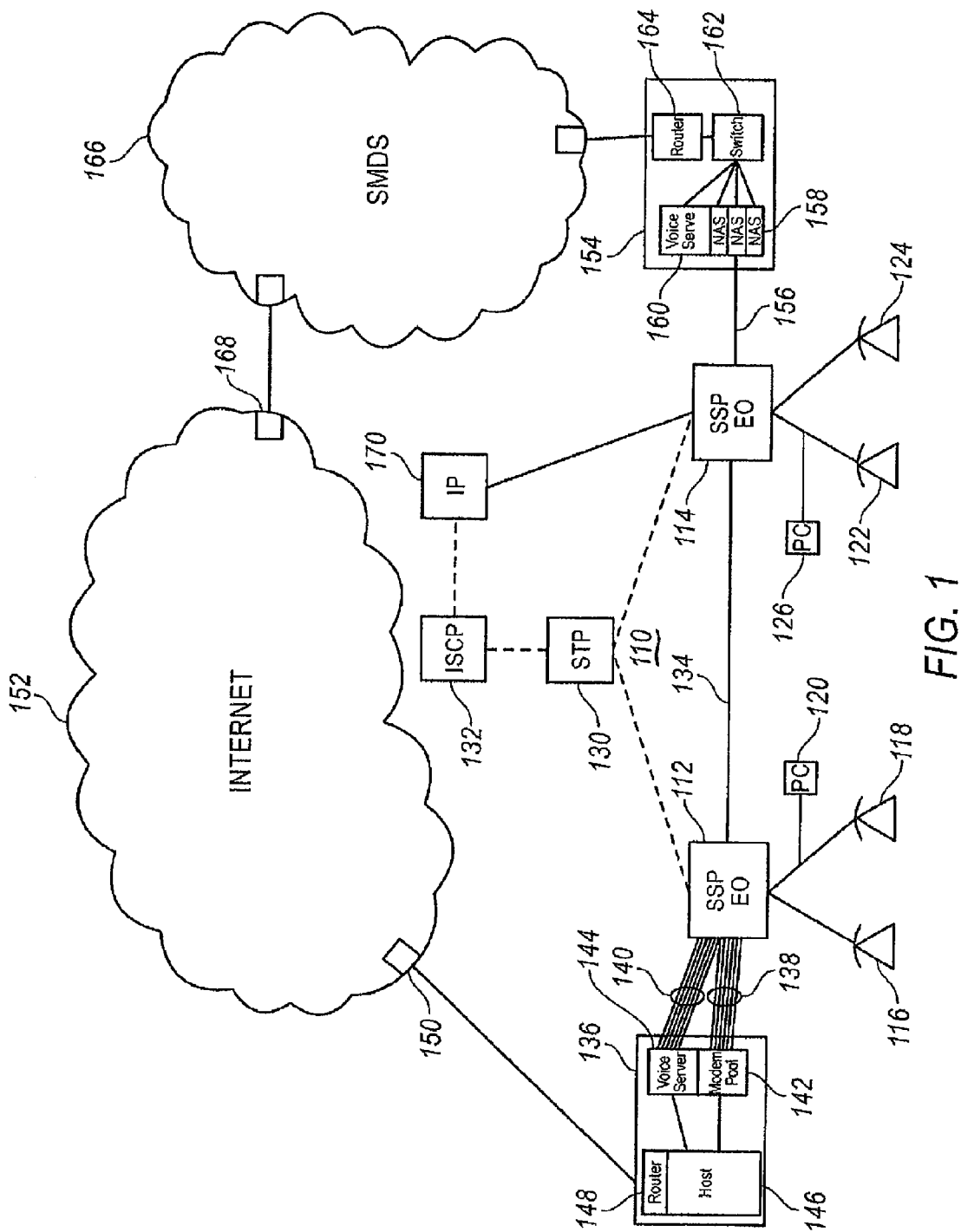
FIG. 1 shows a simplified block diagram of the architecture of one embodiment of a redundant telephony communication network.

Referring to FIG. 1 there is shown a simplified block diagram of the architecture of a preferred embodiment of the present invention which provides relief from another aspect of the multifaceted overload problem. FIG. 1 shows at 110 a public switched telephone network (PSTN) illustratively represented by a pair of SSP (service switching point) capable central office switching systems 112 and 114. The switching system 112 serves as end office for a plurality of customer or subscriber stations such as the telephones 116 and 118 and computer 120. These customer stations or terminals are connected to the central office switching system by local loops 121. In a similar manner the central office switching system 114 serves telephone terminals 122 and 124 and computer or PC 126 via local loops 128.

The central office switching systems 112 and 114 are SSP equipped and connected to an advanced intelligent network or AIN as represented by STP 130 and ISCP 132. The links between the STP, ISCP, and SSP equipped switching systems comprise packet switched data links carrying signaling system 7 (SS7) protocol signals. The central office switching systems are connected by trunks 134 and tandem switches (not shown).

The Internet access plant of a public Internet service provider (ISP) 136 is connected to the central office switch 112 via a first hunt group of lines 138 and a second hunt group of lines 140. The ISP facility is here shown in simplified form comprising a modem pool 142, a voice server pool of application processing units 144, a host or server 146, and router 148. The router 148 is connected to a gateway router 150 to connect to the Internet, shown as a cloud 152.

A telephone company (Telco) access hub 154 is connected to the central office switching system 114 by a plurality of lines, which may include POTS or plain old telephone service connections as well as ISDN links shown collectively at 156. The Telco's hub 154 may be of the type shown and described in detail in the common assignee's copending application Ser. No. 08/815,363, filed Mar. 11, 1997, and entitled Public IP Transport Network, which application is incorporated herein in its entirety by reference.

The Telco access hub is here shown in simplified fashion as comprising a pool of network access servers (NASs) 158, a pool of voice servers 160, an Ethernet packet switch 162, and a gateway router 164. The gateway router is connected via a Telco switched multimegabit data service (SMDS) network 166 to the Internet 152 via an Internet gateway router 168. The voice servers may have Internet interface processors (not here separately shown) with functionality presently to be described.

The Telco access hub is designed to provide access to the Internet and related IP data transport service for users or customers employing a wide variety of procedures and intranetwork protocols. The hub provides Internet access to widespread local areas served by a public switched telephone network. Customers may obtain the use of various types of ports on the Telco platform such as, by way of example, analog 28.8 Kb/s service, ISDN service, dedicated ports for SMDS (switched multimegabyte data service), frame relay, T1, DDS or other available services. As a matter of convenience the hubs will be collocated with central office switching systems and oftentimes may be sited in the same building. Each hub and its equipment will be operated, maintained and provisioned by Telco personnel.

The current availability of the Telco SMDS service, makes it feasible to provide virtually immediate high speed service to business customers capable of interfacing via SMDS. This facilitates limitation of the load or traffic on the gateway routers in the hubs inasmuch as the SMDS signals may be bypassed around the router.

A key component of Telco provided Internet access for the region which it serves is the LATA hub. One such hub is provided for each LATA. Dedicated access is offered from such LATA hubs and will support connectionless services such as frame relay or SMDS. These are currently tariffed fast packet services which are non-distance sensitive. Other presently tariffed services also will be available from such LATA hubs, such as DDS or T1, however these services involve point to point circuits which require additional hardware and are distance sensitive. The Telco access system would allow Internet service provider customers such as UUNet, PSI, and the like, to provide service and seek additional users, while obtaining immediate transport from an alternate source.

The main module of equipment in the hub is the gateway router. The gateway router is connected via redundant links to the Telco SMDS network or "cloud" and thence to the Internet at large. The SMDS links may be 34 Mb/s or T1 links or any combination thereof or of similar links.

The Internet Protocol Routing Service (IPRS) provided by the hub provides for the collection, concentration and management of the customers traffic, IP Routing Service comprises network routers located at LATA hub sites that will collect the customer's (ISP's) end user traffic and concentrate it for connection and transport over a Telco Exchange Access Switched Multi-Megabit Data Service (XASMDS) Subscriber Network Interface.

The operation of this aspect of the system may be described as follows. A public Internet service provider or ISP, such as the ISP 136, may be increasing its customer base and experiencing circuit overload in the Telco network to its retail customers. By way of example, the overload is evidencing itself most adversely in the occurrence of an objectionably high number of busy signals to dial-up customers. The dial-up customers are within the region of the local exchange carrier (LEC) or Telco operating the PSTN which includes the central office switching systems 112 and 114, The Telco offers a public IP transport service through various contract arrangements. This includes use of its AIN equipped network, access hub, and SMDS network for connection to the Internet.

The ISP arranges with the Telco for the Telco to provide for the ISP a specified number of lines to the Telco's Internet access hub, with a sufficient capacity to provide virtually delay free connection to the Internet. The arrangement between the two companies may constitute a continuous lease of lines and access hub capacity by the ISP, or alternatively, may constitute a guarantee of adequate capacity to handle specified overload. As part of the arrangement the Telco will make available to the ISP an AIN/ISCP/IP monitoring and control functionality to provide transfer of load under conditions specified by the ISP.

Thus the AIN control network in FIG. 1 may be provided with an Intelligent Peripheral (IP) 170 of the type described in detail in the above identified copending application Ser. No. 08/816,227. The links between the STP, ISCP, and SSP equipped switching systems comprise packet switched data links carrying signaling system 7 (SS7) protocol signals. The intelligent peripheral 170 is connected to the SSP equipped switching system 114 by a voice and data link which may preferably comprise an ISDN link. The IP connected to the ISCP by a data link separate from the common channel signaling system which may use a signaling protocol such as TCP/IP, a generic data interface (GDI), or a like protocol.

As is described in further detail in the aforementioned copending application Ser. No. 08/816,227, the Telco installs in storage or databases in the ISCP and in the IP, tables of parameters and processing programs which are provided or specified by the ISP. Such parameters may be set for some or all of the dial-up numbers used by the ISP and served by the Telco in the region. The parameters are used to construct the operating algorithms. The experience of operating with the algorithms permits specification of various thresholds designed to signal imminent overload and to trigger preventive action, such as line redirection. The parameters and thresholds may also specify discontinuing the line redirection based on a change in the subsequent values of the same or additional parameters. Discontinuance of redirection may be predicated on "discontinuance" thresholds supplied by the ISP. In a simple case the ISP may direct discontinuing the line redirection when the threshold which was originally exceeded is no longer being exceeded.

While the foregoing-describes an arrangement which provides significant improvement in minimizing or obviating network overload in a retail customer obtaining dial-up access to the Internet, there remains the problem of overload in the Internet itself, as previously described. Such overload is particularly serious in the case of Internet telephony, where delay time may rapidly produce an unacceptable quality of service.

The common assignee's copending application describes a network and method which addresses this problem by initially checking the quality of telephone service which is currently available on the Internet, and establishing an Internet telephone call only if that quality is acceptable to the prospective calling party. Details of this methodology are explained in detail in above mentioned copending application Ser. No. 08/821,027, which is incorporated by reference herein in its entirety.

However, it is also possible that the quality of telephone service available on the Internet may be acceptable at the time that the call is established, but may deteriorate during the call. The problem created by that situation may be ameliorated in the manner now described in relation to FIGS. 2, 3, and 4.

Figure 2:
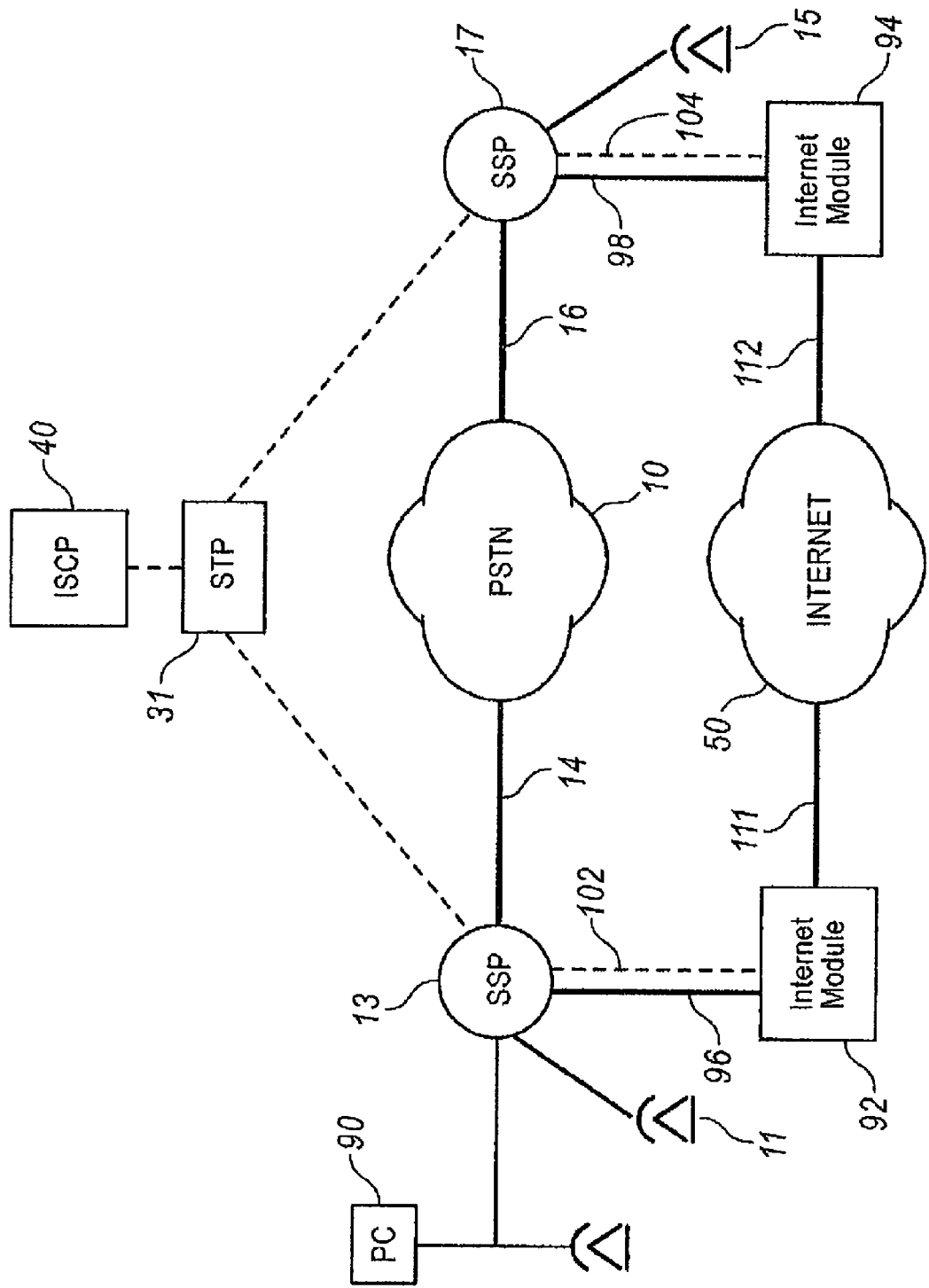
FIG. 2 shows a simplified block diagram of the architecture of another redundant telephony communication network.
Figure 3:
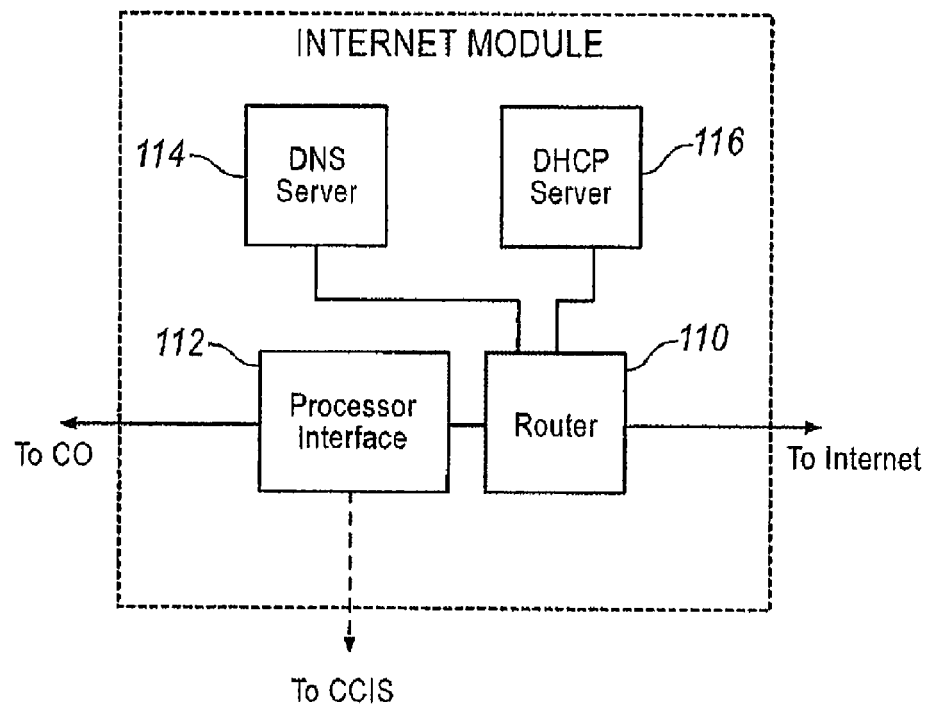
FIG. 3 illustrates the functional architecture of one embodiment of an Internet Module for use in the communication system shown diagrammatically in FIG. 2.

Using the architecture illustrated in FIGS. 2 and 3, the quality of service existing in a data packet network during the course of a voice call through the Internet is monitored. A minimum acceptable level of service may be predefined with a threshold quality level stored in the user's Call Processing Record (CPR) in the AIN Integrated Services Control Point (ISCP). If the monitored quality is maintained in excess of the stored threshold, communication of the call continues through the established course of transmission. If the measured quality of service on the data network is not satisfactory, the routing of the call is changed to communication solely through a voice telephone network connection, which may include an Interexchange Carrier link, without terminating the call. The packet data network is thereby bypassed to obtain voice grade quality while maintaining the call.

FIG. 2 shows a simplified block diagram of an AIN controlled PSTN arranged in an architecture for implementing this improvement. Referring to FIG. 2, SSP capable central offices 13 and 17, which may be located in the same or different states and regions, are connected by trunks 14 and 16 respectively to the PSTN indicated by a cloud 10. Each central office is connected by local loops to subscribers customer premises equipment (CPE) such as telephone terminals 12 and PC 90. The telephone 12 may be a standard telephone used for Plain Old Telephone Service (POTS), with conversion of analog voice to digital signals performed at a central office, or a so-called "Internet Phone" that outputs digital voice signals. The SSPs 13 and 17 are connected by CCIS links to STP 31 which in turn may be connected to ISCP 40. While the STP functionality is here shown as constituting a single STP it will be appreciated that this is for the purpose of simplicity only and that a hierarchy of STPs may be involved.

Each of the central office SSPs 13 and 17 is connected to Internet Module or voice server 92 and 94, respectively, by T1 trunks 96 and 98. Alternatively, the Internet Module hardware may be situated at the central office and associated with the switching system. The Internet Modules or voice servers may be provided with SSP capabilities and connected into the CCIS network directly to an STP or, as illustrated by the links 102 and 104, to the SSPs 13 and 17. The Internet Modules may be linked together for signaling purposes by conventional F links. The Internet Modules are connected to the Internet cloud by T1/T3 trunks 111 and 112.

The functional architecture of one embodiment of an Internet Module which may be utilized in this arrangement is shown diagrammatically in FIG. 3. The Internet Module includes a gateway router 310 of the type now generally used in Internet practice, such as shown in FIG. 1 and described in related application Ser. No. 08/634,544, referenced above. An interface with processing capability is illustratively shown at 312. Connected to the router are a Domain Name Service (DNS) server 314 and a Dynamic Host Configuration Protocol (DHCP) server 316 of the type conventionally used by Internet Service Providers in existing Internet Service. It will be understood that while the DNS and DHCP are here shown as elements of the Internet module they may constitute a DNS and a DHCP connected to the Internet. The router interface is connected to the central office and to the CCIS network while the router is connected to the Internet.

Figure 4:
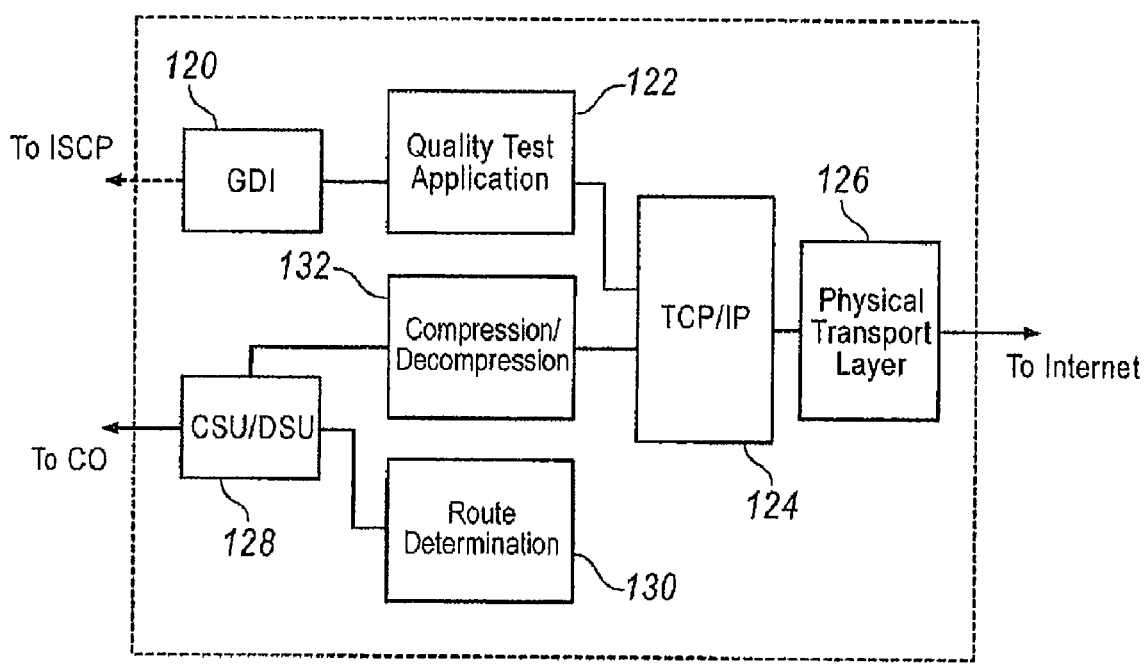
FIG. 4 is a block diagram that represents the functionality of the processor interface of the Internet Module shown in FIG. 3.

FIG. 4 is a block diagram that represents the functionality of the processor interface 312 and the router 310. The processor contains a common Generic Data Interface (GDI) 320 for communicating signaling messages with the ISCP over the common channel signaling network. Data communication by the gateway router of both signaling and information content through the Internet (or other equivalent packet network) occurs through TCP/IP protocol 324, packets being transmitted and received through physical transport layer 326. The physical transport layer may comprise Asynchronous Transfer Mode (ATM), frame relay or some other type of data communication mode.

While message and signaling communication with the common channel signaling network occurs through the GDI, communication of voice data is made through the Channel Serving Unit, Digital Serving Unit (CSU/DSU) 328. This unit, which may physically comprise a digital line card in the processor with standard 24 digital voice line inputs, packetizes voice data received from the telephone central office. The CSU/DSU coordinates with route determination unit 330 to identify packets, termination phone numbers and routes to the network termination gateway router. The route determination information is included in each packet for the data received from the originating central office SSP. The packetized data is compressed in accordance with stored algorithm 332, before being sent to the TCP/IP stack and physical transport layer for transmission to the far end gateway router. To complete transmission to the destination telephone, the termination router decompresses the received packets, depacketizes back to voice data which is then routed to the destination PSTN. Two way capability for each of the functions is provided for communication in both directions. While shown for illustrative purposes as separate blocks, the route determination and compression/decompression functions, as well as the quality test application, may be run, for example, by a UNIX-based computer.

The foregoing arrangements provide for relief from various aspects of the overall network overload problem. Relief for overload in the Internet itself is provided by diverting voice communication via the trunked PSTN. While this is generally acceptable for short haul voice communication it leaves something to be desired in providing relief for long haul traffic. Traffic of that type increases the load on multiple switching systems and interconnecting trunks. By way of example, completing a telephone call over the PSTN in even a limited area, such as the northern Virginia area, may involve the call going through as many as eight to ten offices or switching systems.

Figure 5:
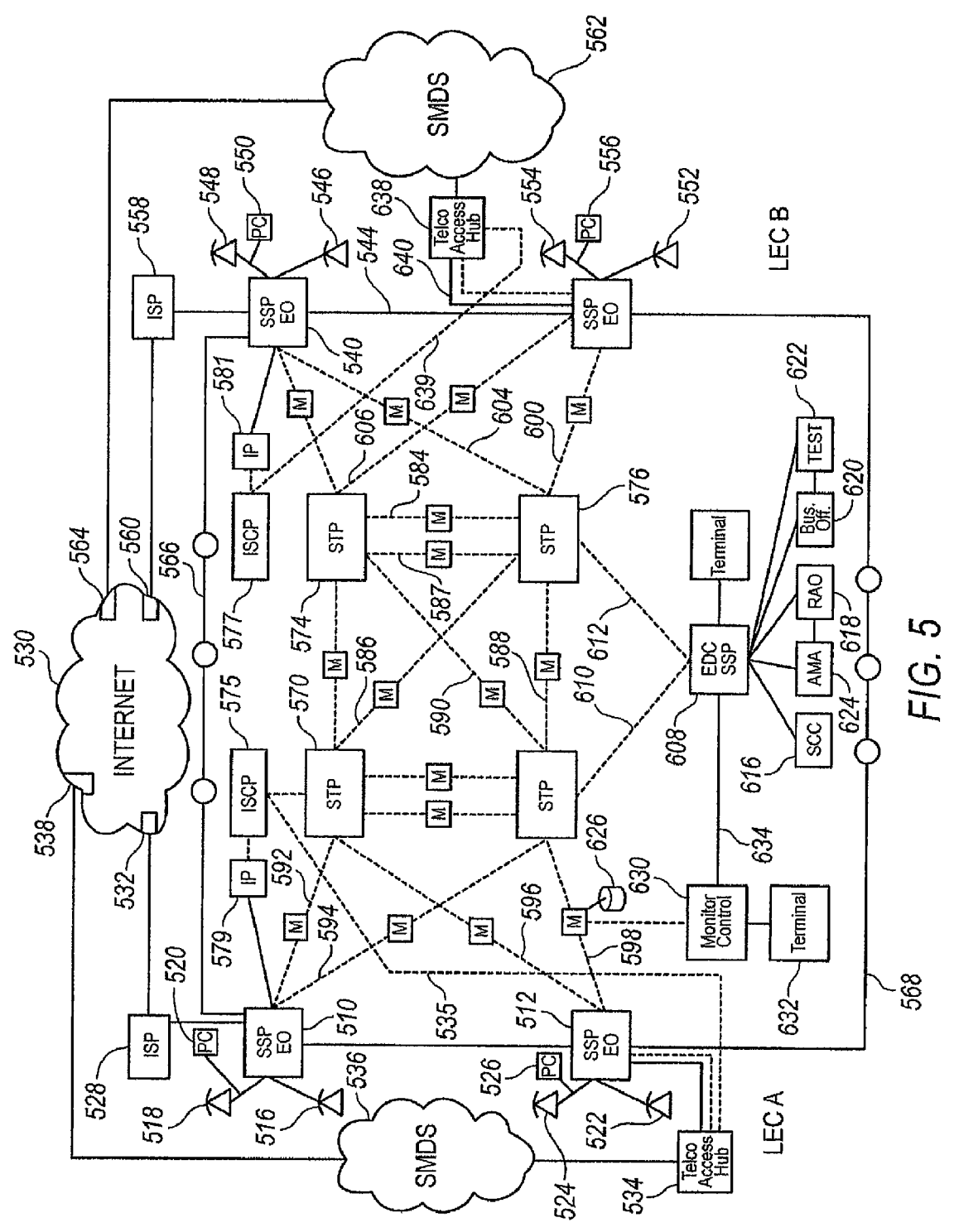

FIG. 5 illustrates a preferred embodiment of the present invention which provides additional relief. According to this embodiment there is provided a still further additional path to relieve congestion not only on the Internet but also on the PSTN or PSTNs which may be required to supply alternate routes.

Referring to FIG. 5, a first regional local exchange carrier (LEC) network A is represented by SSP equipped end offices (SSP/EOs) 510 and 512. SSP/EOs are connected by a representative trunk or trunks 514. These SSP/EOs 510 and 512, respectively, serve subscriber stations represented by telephone terminals 516 and 518 and personal computer (PC) 520, and telephone terminals 522 and 524 and PC 526. In addition to the telephone terminals and PCs, LEC A also serves an ISP 528 via SSP/EO 510. ISP 528 may be of the type illustrated in FIG. 1. The ISP 528 connects to the Internet 530 via a router 532 in the manner shown in FIG. 1. The LEC A also provides through SSP/EO 512 a Telco operated access hub of the type described in connection with FIG. 1. The access hub is connected to the SSP/EO by both voice and data links. The access hub also connects to the LEC SMDS network 536, and from there to the Internet 530 through a router 538.

The distal LEC B is similar to LEC A. LEC B is represented by SSP equipped end offices (SSP/EOs) 540 and 542 connected by a representative trunk or trunks 544. These SSP/EOs serve subscriber stations represented by telephone terminals 546 and 548 and personal computer (PC) 550, and telephone terminals 552 and 554 and PC 556. LEC B also serves an ISP 558 via SSP/EO 540, This ISP also may be of the type illustrated in FIG. 1. The ISP connects to the Internet 530 via a router 560 in the manner shown in FIG. 1. The LEC B also serves through SSP/EO 542 a Telco operated access hub 638 of the type previously described. The access hub connects to the LEC SMDS network 562, and from there to the Internet 530 through a router 564. The Telco access hubs 534 and The LECs A and B are connected by representative trunks 566 and 568 via tandem switches represented by the circles in the trunks.

The telephone system network shown in FIG. 5 is controlled by an advanced intelligent network (AIN), which includes a first mated pair of STPs 570-572 and a second mated pair of STPs 574-576. The mated pairs of STPs are connected to one another by C links 578, 580, 582, and 584. Each mated pair serves its respective transport area. Each STP is connected to an ISCP 575 and 577 and an Intelligent Peripheral (IP) 579 and 581. The IPs may be of the type described in detail in above referenced application Ser. No. 08/816,227. Such IPs provide storage, speech recognition, speech server and other capabilities. The IPSs are connected to the ISCPs and SSPs as described in connection with FIG. 1. The Telco access hubs 534 and 638 are also connected to their respective ISCPs 575 and 577 by GDI links 535 and 639, respectively.

STP 570 is connected to STP 574 by B link 585 and to STP 576 by D link 586. STP 572 is connected to STP 576 by B link 588 and to STP 574 by D link 590. The STPs are connected to SSPs 510, 512, 540, and 542 by A links 592-598.

The SS7 network constitutes a highly redundant data network, generally a 56 K switched data circuit. By way of example, an SS7 message from end office 510 to end office 540 might travel any one of eight possible routes. It could go from 510 to STP 570, from STP 570 to STP 574, STP 574 to SSP or EO 540. One variation on that route would be from STP 570 down the D link 586 to STP 576 to SSP/EO 542, and so forth. In the event a link between STP 570 and SSP/EO 540 was lost, an SS7 route could be established from end office 510 to SSP/EO 542 via STP 570 to STP 574 and the via C link 584 to STP 576 and then via A link 600 to SSP/EO 542. However, that would be an undesirable route unnecessarily using the C link. A links provide direct connectivity while C links provide circuitous routes using extra switches, a situation to be avoided. An alternate route would be from STP 570 via D link 586 to STP 576 via A link 600 to SSP/EO 542.

As is described in detail in the common assignee's above-identified pending application Ser. No. 08/353,281, filed Dec. 5, 1994, and continuation cases above identified, it has been discovered by the applicant that digitized voice may be transported in TCAP format in SS7 signals. It has further been discovered by the applicant that such SS7 voice transport may be carried out in substantially real time through the use of suitable vocoders, PADS, and routers, as described in the aforesaid applications. It is a basic purpose of this invention to utilize the SS7 network as an alternate multi-purpose network for transporting voice signals between calling and called telephone terminals. To this end the SSP/EOs are appropriately enabled as described. The SS7 network may be selected for packetized voice transport as a result of traffic overload in either or both the Internet and/or the PSTN trunked voice network or as a matter of choice.

In normal use of the PSTN the analog voice signal entering the originating end office, such as SSP/EO 512 in FIG. 5, is conventionally transformed in the end office switching system to a digital format and transported in that format through the trunked network 568 to the terminating end office, such as SSP/EO 542. In order to relieve or prevent traffic overload in either or both the Internet or the PSTN, according to the present invention, those signals in whole or in part are transported via the CCIS SS7 network. The digitized voice is packetized by the end office SSP/EO 512 with an appropriate routing label and handling instructions. The packets are then dispatched through the CCIS or SS7 network to the terminating end office SSP/EO 542.

This routing avoids use of the PSTN trunked network and its multiple intervening switching systems. As previously described, use of the PSTN may tie up from 8 to 10 switching offices for a call between two stations in even a limited area. If that same call is handled over the SS7 network it goes directly through that packet network without tying up any switches between the originating office and the terminating office.

This routing also relieves traffic on the lines or trunks used to connect the voice signals to the Telco access hub 534 or the ISP 528, either of which might be used to route the call via the Internet. Still further, this CCIS/SS7 routing reduces traffic in the backbone networks of the Internet and thereby avoids the voice signal degradation which such overload causes.

It is a feature of the invention that the redundancy of the SS7 network and packet switching techniques permits packets traveling different routes to the same destination. This redundancy is utilized as a feature of the invention to enable the existing SS7 network to handle the digital packet voice communication and thereby ameliorate or eliminate traffic overload, without requiring modification of the SS7 system. The SS7 network has been designed to perform its conventional signaling function while utilizing no more than approximately fifty percent of the network capacity. It is a feature of the invention that the availability of spare capacity is determined before diverting voice or other trunk signals into the CCIS SS7 network.

It will be appreciated that this feature of the invention provides a significant degree of solution to the telephone network and Internet congestion or traffic overload problems by opening an entirely new traffic path to carry the load. The amount of traffic diverted from one of the three networks to another may vary depending on fixed or dynamic parameters which may be designed into the network for automatic or manual actuation. The load condition in the CCIS network is monitored prior to the time that traffic is diverted thereby preventing overload of the critical CCIS control network.

According to one embodiment of the invention, there is provided a system and method for utilizing the SS7 or common channel signaling network to perform the still additional function of detecting predetermined events and/or the imminence of predetermined events, and then blocking or controlling those events from their incipiency. In this case it may be desired to divert or redirect calls to a predetermined destination, such as the SS7 network, when the rate of call attempts or calls exceed a specified parameter. One example of such a parameter may be the number of specified occurrences per time period (minute or fraction thereof, hour, etc.).

This is accomplished utilizing the CCIS or SS7 network in conjunction with programmable monitors associated with the CCIS links to the STPs, and control processors for those monitors. According to the invention these monitors are programmed to trap and temporarily record predetermined CCIS signaling data such as call set up messages, associated with specific events, which it is desired to block or control. Call setup messages utilize a call setup protocol known as the Integrated Services Digital Network (ISDN) User Part (ISUP) call setup protocol. The ISUP call setup protocol is described in the Bellcore standards, "TR-NWT 000317, Switching System Generic Requirements for Call Control Using the Integrated Services Digital Network User Part (IS-DNUP)", "TR NWT000394, Switching System Generic Requirements for Interexchange Carrier Interconnection Using the Integrated Services Digital Network User Part (IS-DNUP)", and "TR-NWT000444, Switching System Requirements Supporting ISDN Access Using the ISDN User Part", which are hereby incorporated by reference.

The monitors on the CCIS links to a specified SSP may be programmed to trap selected call set up messages which inquire as to the availability of a line. The same monitors may be programmed to trap call set up messages which inquire as to the availability of a line and indicate that it is not available. Set up signals which indicate unavailability, such as in the case of a busy line, comprise one indication of the maximum load on the available voice circuits. Such a condition may be relieved by the provision of additional lines from the end office to the Internet server. However it is desired to minimize overloading with the existing network. When the occurrence of line busy conditions approaches or exceeds a pre-specified parameter it may provide an indication of the approach of an unacceptable degree of congestion in the voice circuits.

The monitors provide an output to an event detection center (EDC) processor having an SSP capability which is linked to the STPs. The SS7 signaling to and from the STPs can be monitored to maintain a continuous check on the load status of the CCIS SS7 network. The link to the EDC makes this information available to the EDC. According to one embodiment of the invention, the event detection center processor reacts to this information to block or control (such as diverting) specified calls via the CCIS network, after ascertaining that usable capacity exists in that network.

According to another feature of the invention, the event control processor communicates with the monitors either via the STP CCS links or via connection to a controller for the monitors. In this manner it is possible to predict the development of a traffic overload in one type of circuit, the normal voice circuits, and to divert some or all of that traffic into a different type of network in a unique manner to avoid the actual occurrence of the undesired overload situation. The different network, i.e., the CCIS network, thus acts to perform the multiple functions of handling conventional PSTN network control, activating the monitor network to provide warning signals, acting on warning signals from the monitor network control to and direct diversionary switching through CCIS signaling, transporting the diverted signals via the CCIS network, and billing for the call.

Another feature of the invention lies in the fact that no diversion of signals onto the CCIS network will occur if there exists a possibility that the addition of such diverted signals would cause an overload on the CCIS network. In addition to the foregoing, the invention provides that the SS7 network and event control processor may be arranged to supply the additional function of billing for voice calls via the SS7 network as well as the Internet.

Referring to FIG. 5, the above arrangement is now described in additional detail. An Event Detection Center (EDC) 608 includes an SSP and is connected to the common channel signaling network via A links 610 and 612. The EDC includes a processor with associated storage, and operator terminal 614. The EDC is also connected via MF lines to the Switching Control Center (SCC) 616, Revenue Accounting Office (RAO) 618, Business Office (BO) 620, Test Center 622, and Automatic Message Accounting Office (AMA) 624. The business office 620 is connected to the RCMAC (not shown) and to the Test Center. The AMA 624 is connected to the RAO 618.

Each STP is provided with a series of monitors M with one monitor bridged onto each STP link, each monitor having receive and transmit ports. As will be understood by those skilled in the art, each SSP has a point code comprising a nine-digit code assigned to every node in the network. Each operating company has its own network ID normally represented by three digits in the point code. The point code also contains a three-digit cluster number. A cluster can hold 32 SSPs, the SSPs being designated by the final three numbers. According to the invention the monitors M are addressable and have individual point codes for control and programming purposes.

The monitors include processors and temporary storage, as indicated by way of example at 626, connected to the monitor M 628 in FIG. 5. It will be understood that each of the remaining monitors M includes a similar processor and storage. Each of the monitors in a cluster for an STP is connected to a monitor controller 630. The controller 630 includes a processor and storage and may be provided with a terminal 632. The monitors and processors may be of the type described in U.S. Pat. No. 5,478,732, issued Dec. 12, 1995, to Eugene M. Pester III, and assigned to the assignee of the instant application. That patent is incorporated by reference herein in its entirety.

As described in further detail in the aforesaid Pester Patent, the monitors are controllable from remote stations to set traps which may be customized. Thus the monitors are programmed to trap packets and/or selectable fields and/or field contents on a real time basis to permit extremely rapid response to detected conditions. The system and method of the invention are applicable to not only a localized or regional communications network but also to a virtually unlimited interconnection of such networks. The monitors may comprise monitor circuit cards physically mounted at a monitor controller 630, that holds all monitor cards for that cluster. The monitor controller includes a 486 or the like type controller and memory or storage that keeps track of all 32 monitors and handles any messages.

The controller 630 and its monitors M may be regarded as an interface with the SS7 network. The equipment may be conveniently mounted at or adjacent to the STP with which the monitors are associated. A function of the monitor controller is recording all of the data forwarded by the monitors M.

The controller 630 may be similar to the stage one controller described in the aforesaid Pester Patent. The controller 630 is connected to the event detection center 608 via a data link 634. The monitors may physically constitute a back plane capable of handling multiple cards. The monitor cards themselves include multiple monitors, such as four monitors per card. According to the invention the monitors may be programmed by monitor control signals delivered either via the SS7 or CCS network or via the data link between each monitor M and its associated monitor controller 630. In the first instance control signals may be delivered to specifically addressed monitors over the CCS links 610 and 612 in FIG. 5. In the latter instance the control signals are delivered over the line 634 connecting the EDC 608 to the monitor controller 630 and thence over the data link 636 from the monitor controller 630 to the monitor and its associated processor and storage 626.

The processor in the event detection center 608 may be loaded with the desired program or script via the terminal 614. This script will specify for identified monitors the particular signals or portions of signals to be trapped and the nature of the output signal to be delivered to the monitor controller 630. The monitor controller receives this designated information from all specified monitors in its cluster and provides an output signal to the event detection center processor 608 upon the occurrence of predetermined conditions as specified by the event detection center processor. The event detection processor in turn may respond to the receipt of these output signals from the monitor controller by directing to the SS7 or CCS network over the links 610, 612, routing or other control information to direct the handling of predetermined calls or further process the received signals.

The EDC 608 may be programmed from the terminal 614 or from the ISCP via STPs to trap the desired signals and to react to the receipt of the monitor controller output signal to implement various types of billing. This may be initiated by transmitting a signal to the Automatic Message Accounting (AMA) or Station Message Detail Recording (SMDR) Office for dispatch to the Revenue Accounting Office (RAO) for billing of the service and reporting the events that occurred. Further detail regarding such billing is described in the common assignees copending application Ser. No. 08/547,178, filed Oct. 24, 1995, which application is incorporated by reference herein in its entirety. The arrangement shown in FIG. 5 is capable of providing a means for totalizing the units comprising packetized voice signals over the monitored packet switched network during voice communication over the network.

It will be understood that alternate methods may be used relying on the SS7 signaling to effect billing for SS7 and Internet voice calls. While the data internetwork comprising the Internet has been referred to herein it also will be understood that other data internetworks may be used for voice transport and may be billed in a similar manner. While billing in the public switched telephone network has traditionally been based on time of connection for toll calls, it is within the comprehension of the invention that a "per cell" or the like charge arrangement may be used. This is particularly appropriate for the SS7 or CCIS network when it is used as a backbone packet network in the manner of the present invention. The network which is here provided is particularly suited to such a billing arrangement. Not only is the new system capable of obtaining the necessary data via the SS7 CCIS network, but this also may be obtained on a customized basis from the monitoring and superimposed control that is provided.

The operation of the redundant network system shown in FIG. 5 in response to one illustrative example of one type of overload situation is now described. Using the operator terminal 614 the EDC may be programmed to implement the following script or program:

1. Identify the ISP or Telco access hub to which overload protection is to be implemented. In this example it will be assumed that Telco access hub 638 in FIG. 5 is to be protected.

2. Identify the SS7 or CCIS links to the SSP/EO to which that server is connected and identify the addresses of the monitors on those links. In this example those would be the monitors on links 600 and 606.

3. Send monitor set up signals from the EDC computer via either the SS7/CCIS links or the monitor controller to the identified addressed monitors on the specified links.

4. Through such set up signals program those monitors to trap data signals on the specified links which are caused by a call initiation request signal (IAM) requesting a connection to the designated server. The trapped signals will be stored in the temporary storage associated with the monitors.

5. Program the monitors and monitor controller to send to the monitor controller those stored signals which represent IAM signals which encountered a busy condition on the local link 640 to the Telco access hub 638.

6. Set a threshold limit for such busy conditions per time period, i.e., the rate at which such signals are received. When that threshold is reached, the monitor control sends to the event detection control (EDC) a message to take load reduction action.

7. When the EDC receives a signal that load reduction action is indicated it will check the availability of SS7 network capacity to handle overload. An SS7 network available capacity threshold which is necessary to permit diversion of signals onto the SS7 network has previously been set. The links 610 and 612 from the EDC to the STPs provide the EDC with a continuous indication of SS7 network load conditions.

8. When the EDC receives a signal that load reduction action is indicated, and the EDC has determined that excess capacity is available in the SS7 network, it will broadcast a message to all SSP/EOs in LEC-B. Upon receiving this message each SSP/EO sets its program to switch incoming calls bearing an Internet prefix to the SS7 network. This condition of the switches is maintained until a reset signal restores the switches to their former condition.

9. Once the monitor control signals the EDC that the IAM/busy signal threshold has been reached, the monitor control periodically checks its storage to determine if the threshold was reached during the latest predetermined time period. When the monitor control determines that the rate of arrival of IAM/busy signals has dropped below the threshold, it sends a message to the SSP/EOs to reset their programs to discontinue switching incoming Internet calls to the SS7 network.

The operation of the system and method of the invention pursuant to this programming is now described.

In this example an Internet connection is sought to link a calling telephone to a called telephone without using personal or office computer equipment. The subscriber in this example uses a POTS terminal to initiate an Internet call to a called party at a called POTS terminal. The caller goes off-hook and dials *82. This prefix has been established by the Telco offering the service as a predesignated prefix with which the public may initiate an Internet telephone call through a Telco Internet server or access hub. The dialing of the prefix *82 is followed by the dialing of the directory number of the called party.

Alternative to this procedure the Telco may program its switches or SSP/EOs to react to 1+ or 0+ dialing to suspend and return to the caller a recorded query such as "Type of long distance call?". The voice recognition capability of the IPS 579 and 581 may then be utilized to allow the caller to use a voice signal to select between an Internet or telephone network call. The methodology may, for example, be of the type described in further detail in the common assignee's copending application Ser. No. 08/828,781, filed Mar. 27, 1997, entitled Phonetic Voice Activated Dialing. That application is incorporated by reference herein in its entirety. The Telco may also provide the subscribers the option of choosing an SS7 call.

The local SSP/EO to which the calling terminal is connected responds to the off-hook and receives the dialed digits from the calling station. The SSP/EO switching system analyzes the received digits and determines from the prefix *82 that the call is an Internet call. Responsive to its programming it knows that the call must be completed through the Telco access hub, and that further processing is necessary. In this example it is assumed that the Telco access hub must be reached by a different SSP/EO than the SSP/EO to which the calling telephone terminal is connected. Such would be the case in FIG. 5 if telephone terminal 518 was the originating or calling terminal. In that case SSP/EO 510 would be the originating SSP/EO and SSP/EO 512 would be the destination SSP/EO to reach the Telco access hub 534.

The originating SSP/EO central office suspends the call and determines whether or not the lines from the destination SSP/EO to the Telco access hub are busy. If the called access hub line is busy, the destination SSP/EO notifies the originating SSP/EO via conventional SS7 signaling, and the originating SSP/EO provides a busy signal to the calling station.

When the receiving or destination SSP/EO notifies the originating SSP/EO that the access hub line is busy, this SS7 signal is noted by the monitor on the SS7 link on which that signal traveled. The initial inquiry to the destination SSP/EO and the busy response would be trapped by that monitor pursuant to its programming. Also pursuant to that programming the monitor would send request and busy signal sequence signals to the monitor control. The monitor control maintains a timed record of the number of request/busy signals received and increments that store. The monitor control ascertains whether the addition of the latest count reaches the predetermined threshold rate for such signals. If the threshold has not been reached the count is maintained but no action taken. If the threshold has been reached the monitor control signals the EDC to that effect. Upon receiving such notification the EDC checks for the availability of SS7 network capacity. If such capacity is not available no action is taken.

If excess capacity exists on the SS7 network the EDC broadcasts a message to all SSP/EOs in the network. Upon receiving this message each SSP/EO sets its program to switch incoming calls bearing the Telco Internet prefix to the SS7 network. This condition of the switches is maintained until a reset signal restores the switches to their former condition.

The processing sequence may be as follows for an Internet telephone call which is made after the switches have been set to divert Internet telephone calls to the SS7 network.

The caller goes off-hook and dials *82.

The central office SSP/EO responds to the off-hook and receives the dialed digits from the calling station.

The SSP/EO switching system analyzes the received digits and determines from the prefix *82 that the call is an Internet call.

The originating SSP/EO central office suspends the call and sends a CCIS query message through one or more of the STPs to the destination SSP/EO, However, this query is directed to the ultimate destination SSP/EO, which was identified by the destination telephone number initially dialed by the calling party. The message traverses the SS7 network between the two SSP/EOs.

The ultimate destination SSP/EO receives the query and determines whether or not the called station is busy. If the called station is busy, the ultimate destination SSP/EO so informs the originating SSP/EO.

The originating SSP/EO provides a busy signal to the calling station.

If the called station is not busy, the receiving ultimate destination SSP/EO busies out the called station line by blocking all calls.

The receiving or ultimate destination SSP/EO then informs the originating SSP/EO office that the called line is available and waiting and may be reached through the SS7 network.

The originating SSP/EO receives this message and a virtual connection of the two SSP/EOs is established through the SS7 network.

A telephony communication path from the calling to the called telephone terminal has now been established via the SS7 network.

If the call had been made from a telephone terminal connected to the same SSP/EO as the Telco access hub, the SSP/EO makes the busy/not busy determination internally. The switch also knows that it is presently programmed to send Internet calls to the SS7 network. Thus the switch internally directs the call to the SS7 network in the manner described in detail in parent application Ser. No. 08/790,888.

The foregoing operation of the system of the invention provides relief from overload in providing Internet voice communication due to overload in the PSTN access. It is also a feature of the invention that relief is provided where the Internet itself is encountering an overload condition which is producing a degradation of the quality of voice communication which is being supplied. This feature has been described in detail in connection with FIGS. 2-4 and the network illustrated in FIG. 5 includes that functionality. However, the system illustrated and described in relation to FIG. 5 has the additional capability of providing relief from Internet overload not only by diversion to the telephone trunked network, but also by diversion to the SS7 packet network. Not only does this provide the ability to maintain a quality telephone connectivity in the face of Internet overload, it also permits providing this service without having to create additional loading on the trunked telephone network.

According to the invention it is possible to provide multiple classes of telephony communication from telephone terminal to telephone terminal. This not only makes it possible to provide an improved quality of service but also provides a more universal guarantee of a user being able to complete a connection. Multiple options may be provided to the users. Thus the user may select his or her preferred routing at initiation of the establishment of the path. The routing may be changed during a communication to maintain quality.

Improved dial-up access to the Internet improves the reliability of that service for voice communication. If the improved service leads to congestion, the path may be diverted to the SS7 or CCIS network. However the CCIS traffic is monitored and that diversion will not be made if there is no available capacity in that network. If the path is diverted to the CCIS network and traffic approaches an overload point, then voice traffic may be diverted to the trunked network. This is an important feature. The CCIS network is now serving as a backbone packet network but its first priority must be controlling the public switched telephone network. Congestion presents a basic problem on any network and may present complex problems where those networks are interrelated.

The present invention provides not only an improved voice communication medium with redundant paths, but also provide a system and methodology for mediating between the redundant paths. This improves certitude of communication along with improved and monitored quality and maximum access to a minimum cost routing.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

The invention claimed is:

1. A method, comprising:
   establishing a first communication link between a first terminal and a second terminal via a packet switched network;
   transmitting voice information between the first terminal and the second terminal over the first communication link;
   monitoring a quality of service of the first communication link;
   establishing a second communication link between the first terminal and the second terminal via a second network when the monitored quality of service falls below a threshold, wherein the second network excludes a circuit-switched network; and
   transmitting voice information between the first terminal and the second terminal via the second communication link.

2. The method of claim 1, wherein the threshold corresponds to a measure of quality of delivered voice signals.

3. The method of claim 1, wherein establishing the second communication link occurs automatically in response to the monitored quality of service falling below the threshold.

4. The method of claim 1, further comprising transmitting a recorded voice message to the first terminal prior to establishing the second communication link.

5. The method of claim 4, further comprising receiving a response to the recorded voice message from the first terminal prior to establishing the second communication link.

6. The method of claim 1, wherein the first terminal is connected to the first communication link via a first circuit-switched network, and wherein the second terminal is connected to the first communication link via a second circuit-switched network.

7. The method of claim 6, wherein the first circuit-switched network and the second circuit-switched network are part of the Public Switched Telephone Network.

8. The method of claim 1, wherein the first terminal and the second terminal comprise telephone terminals.

9. The method of claim 1, wherein the packet switched network includes the Internet, and the second network includes the Common Channel Interoffice Switching system.

10. The method of claim 1, further comprising:
    measuring a quality of service of the second network; and
    establishing the second communication link when the monitored quality of service of the first communication link falls below the threshold and the quality of service of the second network is above a second threshold.

11. The method of claim 10, wherein the quality of service of the second network is based on available capacity, and the second threshold corresponds to a minimum available capacity.

12. The method of claim 1, further comprising retrieving the threshold from a record associated with a user of the first terminal.

13. The method of claim 1, wherein the first communication link uses Internet Protocol (IP) communications, and wherein establishing the first communication link comprises determining an IP address for a terminating gateway router that is connected to the packet switched network and configured to communicate with the second terminal.

14. A method, comprising:
- monitoring a quality of service metric of communications over a packet switched network, the quality of service metric including a measurement of unavailability conditions in response to a call set-up message;
- transmitting a first message to a plurality of switches when the quality of service metric meets a threshold level, the first message indicating that communications may be established using the packet switched network;
- setting an indication in each of the plurality of switches for the packet switched network based on the first message;
- receiving at one of the plurality of switches a request to establish a voice communication between a first terminal and a second terminal;
- establishing the voice communication between the first terminal and second terminal via the packet switched network when the indication is set at the one of the plurality of switches for the packet switched network; and
- establishing the voice communication between the first terminal and second terminal via a second network when the indication is not set at the one of the plurality of switches for the packet switched network, wherein the second network excludes a circuit-switched network.

15. The method of claim 14, wherein monitoring the quality of service metric includes
- detecting at least one unavailability message,
- determining a rate of detection of the at least one unavailability message, and
- comparing the rate of detection to the threshold level.

16. The method of claim 14, further comprising:
- transmitting a second message to the plurality of switches when the quality of service metric does not meet the threshold level, the second message indicating that communications may be established using the second network; and
- setting the indication in each of the plurality of switches for the second network based on the second message.

17. The method of claim 14, wherein the packet switched network includes the Internet, and the second network includes the Common Channel Interoffice Switching system.

18. A method, comprising:
- establishing a first communication link between a first terminal and a second terminal via a packet switched network;
- transmitting voice information between the first terminal and the second terminal over the first communication link;
- monitoring a quality of service on the first communication link; and
- establishing a second communication link between the first terminal and the second terminal via a second network when the monitored quality of service does not meet a threshold, and wherein the second network excludes a circuit-switched network.

19. The method of claim 18, wherein the threshold corresponds to a measure of quality of delivered voice signals.

20. The method of claim 18, wherein establishing the second communication link occurs automatically in response to the monitored quality of service falling below the threshold.

21. The method of claim 18, further comprising:
- transmitting a recorded voice message to the first terminal when the monitored quality of service of the first communication link does not meet the threshold; and
- establishing the second communication link between the first terminal and the second terminal via the second network after receiving a response to the recorded voice message from the first terminal.

22. The method of claim 18, further comprising retrieving the threshold from a record associated with a user of the first terminal.

23. The method of claim 18, wherein the first communication link uses Internet Protocol (IP) communications, and wherein establishing the first communication link comprises determining an IP address for a terminating gateway router that is connected to the packet switched network and configured to communicate with the second terminal.

* * * * *